(12) United States Patent  
Sakai

(10) Patent No.: US 7,034,973 B2
(45) Date of Patent: Apr. 25, 2006

(54) SCANNING OPTICAL SYSTEM, OPTICAL SCANNING DEVICE, AND IMAGE FORMING APPARATUS

(75) Inventor: Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 27 days.

(21) Appl. No.: 10/391,580

(22) Filed: Mar. 20, 2003

(65) Prior Publication Data
US 2003/0214694 A1  Nov. 20, 2003

(30) Foreign Application Priority Data

| Mar. 22, 2002 | (JP) | 2002-080855 |
| Apr. 4, 2002 | (JP) | 2002-102560 |
| Apr. 11, 2002 | (JP) | 2002-109377 |
| Apr. 18, 2002 | (JP) | 2002-116673 |
| May 15, 2002 | (JP) | 2002-139712 |

(51) Int. Cl.
*G02B 26/08* (2006.01)
(52) U.S. Cl. .................. 359/205; 359/206; 359/207
(58) Field of Classification Search ............ 359/205, 359/207, 206, 212, 216–219, 197; 347/256, 347/258, 259
See application file for complete search history.

(56) References Cited

U.S. PATENT DOCUMENTS

| 5,805,199 | A | * | 9/1998 | Aoki .................... 347/256 |
| 5,831,758 | A | | 11/1998 | Sakai et al. |
| 5,999,345 | A | | 12/1999 | Nakajima et al. |
| 6,166,842 | A | | 12/2000 | Aoki et al. |
| 6,229,638 | B1 | | 5/2001 | Sakai et al. |
| 6,256,133 | B1 | | 7/2001 | Suzuki et al. |
| 6,288,819 | B1 | | 9/2001 | Aoki et al. |
| 6,347,004 | B1 | | 2/2002 | Suzuki et al. |
| 6,348,988 | B1 | | 2/2002 | Aoki et al. |
| 6,348,989 | B1 | | 2/2002 | Aoki et al. |
| 6,359,717 | B1 | | 3/2002 | Suzuki et al. |
| 6,366,384 | B1 | | 4/2002 | Aoki et al. |
| 6,388,792 | B1 | | 5/2002 | Atsuumi et al. |
| 6,445,483 | B1 | * | 9/2002 | Takada et al. ............ 359/207 |
| 6,448,998 | B1 | | 9/2002 | Suzuki et al. |
| 6,509,995 | B1 | | 1/2003 | Suzuki et al. |
| 6,590,688 | B1 | * | 7/2003 | Ishihara .................... 359/205 |
| 2001/0055140 | A1 | | 12/2001 | Sakai et al. |
| 2002/0080428 | A1 | | 6/2002 | Suzuki et al. |

OTHER PUBLICATIONS

U.S. Appl. No. 10/984,930, filed Nov. 10, 2004, Sakaue et al.

* cited by examiner

*Primary Examiner*—Drew A. Dunn
*Assistant Examiner*—Joshua L. Pritchett
(74) *Attorney, Agent, or Firm*—Oblon, Spivak, McClelland, Maier & Neustadt, P.C.

(57) ABSTRACT

A scanning optical system condensing a light flux deflected by an optical deflector so as to form an optical spot on a surface to be scanned, includes a unitary lens, wherein: a lens configuration in a main scanning cross section is both surfaces with a convex configuration; a lens configuration in a sub-scanning cross section is both surfaces with a convex configuration; both surfaces of the lens are anamorphic surfaces; and a lateral magnification $\beta_2$ in a sub-scanning direction of a central image height of said optical system satisfies the following condition (1):

$$0.5 \leq |\beta_2| \leq 3.0. \tag{1}$$

62 Claims, 10 Drawing Sheets

SCANNING OPTICAL SYSTEM, OPTICAL SCANNING DEVICE, AND IMAGE FORMING APPARATUS

BACKGROUND OF THE INVENTION

1. Field of the Invention

The present invention relates to a scanning optical system, an optical scanning device, and an image forming apparatus.

2. Description of the Related Art

Optical scanning device are widely known in connection with a laser printer and digital copiers. A scanning optical system is used for the optical scanning device and an optical system wherein the light flux deflected by an optical deflector is condensed on a scanned surface as an optical spot.

Conventionally, the number of lenses of the scanning optical system formed as a lens system varies from one to a plurality. Although a unitary lens is effective for reducing manufacturing costs, the number of design parameters of the scanning optical system formed by a unitary lens is extremely small as compared with the scanning optical system formed by a plurality of lenses. Hence, it is difficult to realize good aberration correction in a case of a simple lens surface configuration.

In addition, it has been suggested to better correct the aberration and a uniform velocity property of the scanning optical system formed by a unitary lens by applying a specific lens surface configuration, as shown in Japanese Laid-Open Patent Applications, No. 9-33850, No. 10-90620, and No. 10-148755.

In order to respond to recent demand that the optical scanning device have a high density of the optical scanning, it is required for the optical spot to have a small diameter and stability. In order to realize an optical spot with the small diameter and stability, it is important to make uniform the wave-optic wavefront aberration whatever the image height is, as well as to improve the geometric-optic aberration, for the scanning optical system. However, the above mentioned publications do not refer to such wave-optic wavefront aberration correction.

SUMMARY OF THE INVENTION

Accordingly, it is a general object of the present invention to provide a novel and useful scanning optical system, optical scanning device, and image forming apparatus, wherein not only a good geometrical optical aberration correction but also a good wave-optic wavefront aberration correction can be implemented although only one lens is used for the scanning optical system.

Another and more specific object of the present invention is to provide a scanning optical system condensing a light flux deflected by an optical deflector so as to form an optical spot on a surface to be scanned, including a unitary lens, wherein: a lens configuration in a main scanning cross section is both surfaces with a convex configuration; a lens configuration in a sub-scanning cross section is both surfaces with a convex configuration; both surfaces of the lens are anamorphic surfaces; and a lateral magnification $\beta_2$ in a sub-scanning direction of a central image height of said optical system satisfies the following condition (1):

$$0.5 \leq |\beta_2| \leq 3.0 \tag{1}$$

The above objects of the present invention are achieved by a scanning optical system condensing a light flux deflected by an optical deflector so as to form an optical spot on a surface to be scanned, including a unitary lens, wherein: a lens configuration in a main scanning cross section is both surfaces with a convex configuration; a lens configuration in a sub-scanning cross section is both surfaces with a convex configuration; both surfaces of the lens are anamorphic surfaces; a curvature radius $R_{m1}$ of an entering side surface in the main scanning cross section and a curvature radius $R_{m2}$ of an emitting side surface in the main scanning cross section satisfy the following condition (4):

$$|R_{m1}| \geq |R_{m2}|; \text{ and} \tag{4}$$

a curvature radius $R_{S1}$ of an entering side surface in the sub-scanning cross section and a curvature radius $R_{S2}$ of an emitting side surface in the sub-scanning cross section satisfy the following condition (5):

$$|R_{S1}| \geq |R_{S2}|. \tag{5}$$

The above objects of the present invention are achieved by a scanning optical system condensing a light flux deflected by an optical deflector so as to form an optical spot on a surface to be scanned, including a unitary lens, wherein: a lens configuration in a main scanning cross section is both surfaces with a convex configuration; a lens configuration in a sub-scanning cross section is both surfaces with a convex configuration; both surfaces of the lens are anamorphic surfaces; a configuration in a main scanning cross section of the both surfaces is a non-arc configuration; both surfaces of the lens are specific surfaces where curvature in the sub-scanning cross section is changed consecutively in a main scanning direction; and a change in the main scanning direction of a curvature in the sub-scanning cross section is asymmetrical with respect to an optical axis, in at least one surface of the lens.

The above objects of the present invention are achieved by a scanning optical system condensing a light flux deflected by an optical deflector so as to form an optical spot on a surface to be scanned, comprising a unitary lens, wherein: a lens configuration in a main scanning cross section is both surface with a convex configuration; a lens configuration in a sub-scanning cross section is both surface with a convex configuration; both surfaces of the lens are anamorphic surfaces; and at least one surface of the lens is a curvature constant surface where curvature in the sub-scanning cross section is constant in a main scanning direction.

In the present invention, since both a main scanning cross section and a sub-scanning cross section of the scanning optical system consisting of a unitary lens have both convex configurations, deterioration of the wave surface aberration can be controlled by distributing positive powers in the main and sub scanning directions of the scanning optical system to respective lens surfaces of entrance and exit sides. Thus, because the deterioration of the wave surface aberration can be controlled, the spot diameter of the optical spot on the scanned surface can be made small so as to correspond to writing with high density.

A lateral magnification $|\beta_2|$ in the sub-scanning direction at a central image height of the scanning optical system where the image height is 0, is represented as follows. $\beta_2$=(the distance from the lens surface of the exit side of the scanning optical system to the scanned surface)/(the distance from a starting point of the deflection of the optical deflector to the lens surface of the entrance side of the scanning optical system)

More particularly, in the present invention, the condition (1) is represented as follows.

$$0.5 \leq |\beta_2| \leq 3.0 \tag{1}$$

When $|\beta_2|$ is smaller than 0.5 that is a minimum limitation value, the optical scanning system approaches the side of the surface to be scanned, and the scanning optical system becomes large and thereby the manufacturing cost thereof is high.

When $|\beta_2|$ exceeds 3.0 that is a maximum limitation value, the scanning optical system reaches the optical deflector. In a case of the scanning optical system being a resin molded product, the influence of heating of the optical deflector is easily given to the scanning optical system so that the scanning optical system becomes deformed and the optical ability is easily degraded. In order to prevent the above situation, if the scanning optical system is far apart from the optical deflector, as corresponding, the distance between the optical deflector and the scanned surface is made long so that the optical scanning device is large-sized.

Furthermore, since the longitudinal magnification is made large, based on the change of position in the optical axis of the scanning optical system, the image formation position of the deflected light flux is easily shifted against the scanned surface and the spot diameter can be easily changed. Hence, it is difficult to have proper processing precision and installation precision of parts.

However, when the condition (1) is satisfied, the scanning optical system can be arranged at a proper position between the optical deflector and the scanned surface. In addition, in a case where the scanning optical system is a resin molded product, it will be difficult to influence the optical system by the heating of the optical deflector and thereby low manufacturing cost and making a size of the optical scanning device compact can be advantageously achieved.

Since the scanning optical system of the present invention has both lens surfaces being anamorphic surfaces, the uniform velocity characteristic in the main scanning surface such as a fθ characteristic is secured and a function by which the surface inclination of the optical deflector can be corrected in the sub-scanning direction can be realized. In addition, since respective surfaces are anamorphic surfaces, the power in the sub-scanning direction can be distributed to the respective surfaces without any obstacles.

In order to control deterioration of the wave surface aberration effectively, it is preferable that the diameter of curvature of the entrance side surface be larger than the diameter of curvature of the exit side surface. By satisfying the following conditions (4) and (5), it is possible to control deterioration of the wave surface aberration effectively.

(4) $|R_{m1}| \geq |R_{m2}|$ where $R_{m1}$ is the curvature radius of the entering side surface in the main scanning cross section and $R_{m2}$ is the curvature radius of the emitting side surface in the main scanning cross section. In a case where configurations of the lens surfaces in the main scanning and sub-scanning cross sections are non-arc configurations, $R_{m1}$ and $R_{m2}$ mean radii of the curvature of the paraxial axis. (5) $|R_{S1}| \geq |R_{S2}|$ where $R_{S1}$ is the curvature radius of the entering side surface in the sub-scanning cross section and $R_{S2}$ is the curvature radius of the emitting side surface in the sub-scanning cross section. In a case where configurations of the lens surfaces in the main scanning and sub-scanning cross sections are non-arc configurations, $R_{S1}$ and $R_{S2}$ mean radii of the curvature of the paraxial axis.

In order to control the deterioration of the wave surface aberration in order to make the spot diameter of the optical spot small, there is a restriction if the deterioration of the wave surface aberration is controlled only by the scanning optical system. In this case, it becomes easy to control the wave surface aberration by using the shape of the light flux entering the scanning optical system which is also used as a parameter of the correction of the aberration of the wave surface. Furthermore, if the light flux entering the scanning optical system is made convergent in the main-scanning direction, the curvature in the main scanning direction of the scanning optical system can be small so that both controlling the deterioration of the wave surface aberration and achieving good uniform velocity can be done.

In order to perform satisfactory scanning, it is important that the diameter (in particular, the diameter in the sub-scanning direction because, although correction of the diameter in the main scanning direction can be made through correction of a resulting electrical signal, such correction of the diameter in the sub-scanning direction cannot be made) of the beam spot on the surface to be scanned does not change much according to the image height. This matter is important in particular for scanning in high density.

In order that the diameter in the sub-scanning direction of the beam spot on the surface to be scanned does not change much according to the image height, it is necessary that the lateral magnification $|\beta|$ in the sub-scanning direction of the scanning optical system does not change according to the image height.

It is important for optical scanning of the multi-beam method to reduce a deviation of the pitch of the scan lines made by simultaneous scanning (referred to as scan-line pitch, hereinafter). The deviation of the pitch of the scan lines is defined as a difference between maximum value and minimum value of image heights of neighboring scan line pitches.

Change of the lateral magnification $|\beta|$ in the sub-scanning direction according to the image height problematically results in change of the pitch of the scan lines made by simultaneous scanning (referred to as scan-line pitch, hereinafter) according to image height in the multi-beam system. Hence, in the scanning optical system in the multi-beam system, in order to prevent change of scan-line pitch according to image height (simply referred to as pitch change, hereinafter), it is necessary to make a correction such that the lateral magnification in the sub-scanning direction of the scanning optical system becomes uniform whatever the image height is.

To make a correction such that the lateral magnification in the sub-scanning direction of the scanning optical system becomes uniform whatever the image height is, can be achieved by applying a specific surface to at least one surface. Here, the specific surface is defined as a surface where the curvature in the sub-scanning cross section is changed in the main scanning direction. That is, the specific surface is a lens surface where the curvature in the sub-scanning cross section is changed corresponding to a position in the sub-scanning cross section when the position in the sub-scanning cross section is changed in the main scanning direction.

When a polygon mirror is used as the optical deflector, the rotation center of the polygon mirror is set to be different from the optical axis of the scanning optical system. Accordingly, the reflecting point on the deflection reflective surface changes according to the beam deflection, and the starting point of deflection of the deflected light flux changes. Thus, optical sag occurs. Thereby, the path the light flux passing through on the side of + image height of the optical axis of the scanning optical system is different from that on the side of − image height of the optical axis of the scanning optical system. Accordingly, the lateral magnification in the sub-scanning direction changes asymmetrically in the main scanning direction.

This asymmetrical change in lateral magnification can be corrected as a result of at least one surface of the above-mentioned specific surfaces being made to be a surface in which change in sub-scanning curvature is asymmetrical with respect to the optical axis. The sub-scanning curvature is the above-mentioned curvature in a sub-scanning section.

The surface in which change in sub-scanning curvature is asymmetrical with respect to the optical axis is, for example, a surface in which (a) change in sub-scanning curvature is such that the curvature monotonously increases bilaterally-asymmetrically as being apart from the optical axis in the main scanning direction;

(b) change in sub-scanning curvature is such that the curvature monotonously decreases bilaterally-asymmetrically as being apart from the optical axis in the main scanning direction;

(c) change in sub-scanning curvature is such that the extremity of curvature exists out of the optical axis;

(d) change in sub-scanning curvature is such that the curvature monotonously increases from the side of + image height to the side of − image height;

(e) change in sub-scanning curvature is such that the curvature monotonously decreases from the side of + image height to the side of − image height;

(f) change in sub-scanning curvature is such that there are a plurality of extremities of curvature;

or the like. However, the surface in which change in sub-scanning curvature is asymmetrical may be any surface having no general axis of rotational symmetry as the optical axis. Which of theses surface is to be employed as the surface in which change in sub-scanning curvature is asymmetrical is determined according to design conditions.

In this specification, the optical axis of the lens having the asymmetric configuration shall mean a standard axis perpendicular to the main scanning and sub-scanning directions in a standard coordinate system determining a lens surface configuration.

Whether in the single-beam system or multi-beam system, it is preferable that the change of lateral magnification $|\beta|$ in the sub-scanning direction in the effective scanning range be equal to or smaller than 10%; more particularly, that it be equal to or smaller than 7%. That is, $|\beta_h/\beta_2|$, namely $\beta_2$ that is a lateral magnification in the sub-scanning direction at a central image height and $\beta_h$ that is a lateral magnification in the sub-scanning direction at any image height satisfy the following condition (2).

$$0.9 \leq |\beta_h/\beta_2| \leq 1.1; \tag{2}$$

$0.93 \leq |\beta_h/\beta_2| \leq 1.07$ is more preferable.

In the case of the multi-beam optical scanning, when change of lateral magnification in the sub-scanning direction is equal to or smaller than 7%, pitch change is 10.37 μm for the simultaneous scan-line pitch of 148.19 μm even when seventh-order interlaced scanning at 1200 dpi is performed, and it is possible that the pitch change is about half the adjacent pitch of 21.17 μm at 1200 dpi.

It is also important that the position of beam waist in the sub-scanning direction for forming the beam spot on the surface to be scanned does not change much according to image height for performing satisfactory scanning. In order that the position of beam waist in the sub-scanning direction of the beam spot on the surface to be scanned does not change much according to the image height, it is necessary that a sub-scanning curvature of field of the scanning optical system does not dramatically change much according to image height.

That is, it is preferable for $F_S$ that is the width of the sub-scanning curvature of field and for W that is an effective writing width to satisfy the following condition (3).

$$F_S/W < 0.001 \tag{3}$$

Here, the effective writing width is an optical scanning area where image writing can be implemented effectively by optical scanning. The sub-scanning curvature of field is a curvature of field in the sub-scanning direction. Furthermore, the curvature of field in the main scanning direction is called the main scanning curvature of field.

In order that the above-mentioned condition (3), with satisfaction of the condition (2), is satisfied, it is necessary to consider optical sag for the sub-scanning curvature of field of the scanning optical system. Influence of optical sag on the sub-scanning curvature of field does not necessarily coincide with influence of the optical sag on the change of lateral magnification in the sub-scanning direction of the scanning optical system.

Because of this, in order to correct asymmetrical change of the lateral magnification and the asymmetry of the sub-scanning curvature of field, it is preferable that a specific surface wherein the change in the main scanning direction of the curvature in the sub-scanning direction is asymmetrical with respect to the optical axis, is applied to both surfaces of the scanning optical system.

Alternatively, it is possible to have a particular relationship with regard to the correction of the sub-scanning curvature of field and the correction of the change of the lateral magnification, by setting an aimed spot diameter of the scanned surface and by how the scanning optical system is arranged.

In the above mentioned case, it is preferable to apply the specific surface to only one surface and to make the surface opposite to the specific surface have a constant curvature where the curvature of the sub-scanning cross section is constant in the main scanning direction.

The specific surface has a complex configuration. In addition, in a case where the change in the main scanning direction of the curvature in the sub-scanning cross section is asymmetrical in the main scanning direction, it may be difficult to find the position of the optical axis. Because of this, if the both surfaces are specific surface, it may be difficult to maintain the ability of the scanning optical system. Therefore, it is preferable to minimize the application of the specific surface in terms of maintaining the ability of the scanning optical system and reduction of the manufacturing cost.

On the other hand, if a surface opposite to the specific surface is made to have a constant curvature, the lens surface configuration in the main scanning cross section is maintained regardless of the height in the sub-scanning direction. Hence, in this case, if the lens gets out of position based on the lack of installation precision, advantageously, a problem in terms of the optical ability does not occur at all. In addition, there is an advantage of being able to easily evaluate the scanning optical system because the curvature in the sub scanning cross section is constant regardless of the position in the main scanning direction.

Further, as a result of the configuration from the line-image forming optical system to the scanning optical system being used in common for a plurality of coupled beams in the above-described optical scanning device in the multi-beam system, it is possible to configure the configuration including and subsequent to the line-image forming optical system to be the same as that for the optical scaling device in the single-beam system. Accordingly, it is possible to achieve an optical scanning device in the multi-beam system very stable against structural changes.

In the case of an optical scanning device in the multi-beam system, a light source either of an LD-array system or of a beam-combining system can be used. When a light source in the LD-array system is used, it is necessary that the intervals between light-emitting sources are large to some extent so as to remove influence of thermal/electrical mutual actions in the light-emitting sources. By making each the intervals between the light-emitting sources of a semiconductor laser array to be equal to or larger than 10 μm as mentioned above, it is possible to effectively reduce the influence of thermal/electrical mutual actions in the light-emitting sources and to perform satisfactory multi-beam scanning.

Other objects and further features of the present invention will become apparent from the following detailed description when read in conjunction with the accompanying drawings.

DETAILED DESCRIPTION OF THE PREFERRED EMBODIMENTS

First Embodiment

Figure 1:
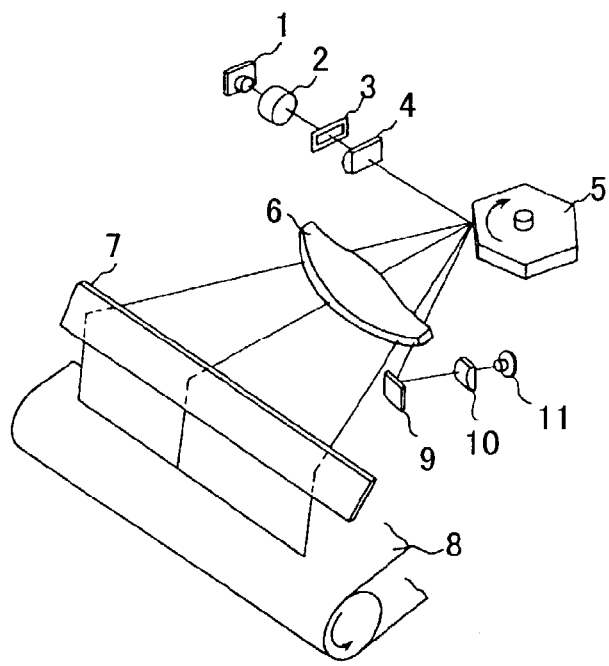
FIG. 1 is a perspective view of one preferred embodiment of a single beam optical scanning device of the present invention.

FIG. 1 is a perspective view of one preferred embodiment of a single beam optical scanning device of the present invention.

Referring to FIG. 1, a divergent light flux emitted from a semiconductor laser as a light source 1 is transformed into a light flux form suitable for a subsequent optical system by a coupling lens 2. The light flux transformed into the suitable form by the coupling lens 2 can be parallel light flux, or weak divergent or weak convergent light flux.

After the light flux passes through the coupling lens 2, an adjacent portion of the light flux is blocked so as to be beam-shaped by the aperture 3 so that the light flux enters a cylindrical lens 4 acting as a line-image forming optical system. The cylindrical lens 4 is disposed in such a manner that the direction of the cylindrical lens 4 in which the lens has no power coincides with the main scanning direction, and the lens 4 has positive power in the sub-scanning direction. The cylindrical lens 4 condenses the incident light in the sub-scanning direction to a position on or in the proximity of the deflection reflective surface of a polygon mirror 5 acting as an optical deflector, as a line image long in the main scanning direction.

The light flux reflected by the deflection reflective surface is deflected thereby at a uniform angular velocity while the rotational polygon mirror 5 is rotating at a uniform angular velocity and passes through a unitary lens 6 acting as a scanning optical system. And then the optical path of the light flux is bent by a bending mirror 7. As a result of this, the light flux is condensed on an optical conductive photoreceptor (a photosensitive image carrier) 8 that is a substantially scanned surface, as an optical spot, and scans the scanned surface.

The deflected light flux is reflected by a mirror 9 prior to the optical scanning and is condensed in a beam receiving element 11 by a lens 10. Based on output from the beam receiving element 11, a timing of writing beginning timing of the optical scanning is determined.

By the scanning optical system, the light flux deflected by the beam deflector 5 condenses on the scanned surface 8 as the optical spot. The scanning optical system includes a unitary lens 6. The lens 6 has both surfaces having convex shapes in main scanning cross section and both surfaces having convex shapes in sub-scanning cross section. Both surfaces are anamorphic surfaces wherein power in the main scanning direction is different from power in the sub-scanning direction. The "main scanning cross section" is an imaginary plane cross section including an optical axis of a lens acting as a scanning optical system and in parallel to the main scanning direction. The "sub-scanning cross section" is an imaginary plane cross section perpendicular to the main scanning direction at any position of the main scanning direction of the lens acting as the scanning optical system.

In one case, the lens is also required to satisfy the following condition (1).

(1) $0.5 \leq |\beta_2| \leq 3.0$, wherein $\beta_2$ represents a lateral magnification in the sub-scanning direction at a central image height where the image height is 0.

It is preferable for the lens 6 in this case to have at least one of the following conditions (2) through (5):

(2) $0.9 \leq |\beta_h/\beta_2| \leq 1.1$, where $\beta_2$ represents a lateral magnification in the sub-scanning direction at a central image height and $\beta_h$ represents a lateral magnification in the sub-scanning direction at any image height;

(3) $F_S/W < 0.001$, where W represents an effective writing width and $F_S$ is a width of a sub-scanning curvature of field. The effective writing width is an optical scanning area where image writing can be implemented effectively by optical scanning. The sub-scanning curvature of field is a curvature of field in the sub-scanning direction. Furthermore, a curvature of field in the main scanning direction is called a main scanning curvature of field;

(4) $|R_{m1}| \geq |R_{m2}|$, where $R_{m1}$ is a curvature radius of an entering side surface in a main scanning cross section and $R_{m2}$ is a curvature radius of an emitting side surface in a main scanning cross section. In a case where configurations of the lens surface in the main scanning and sub-scanning cross sections non-arc configurations, $R_{m1}$ and $R_{m2}$ mean radii of the curvature of the paraxial axis; and (5) $|R_{S1}| \geq |R_{S2}|$, where $R_{S1}$ is a curvature radius of an entering side surface in a sub-scanning cross section and $R_{S2}$ is a curvature radius of an emitting side surface in-a sub-scanning cross section. In a case where configurations of the lens surface in the main scanning and sub-scanning cross sections non-arc configurations, $R_{S1}$ and $R_{S2}$ mean radii of the curvature of the paraxial axis.

In another case, the lens 6 is also required to satisfy the above mentioned conditions (4) and (5) In this case, it is preferable for the lens 6 to have at least one of the above mentioned conditions (1) through (3).

In yet another case, both surfaces of the lens 6 are required to have non-arc configurations in the main scanning cross section. In addition, both surfaces are specific surfaces wherein curvatures in the sub-scanning cross section are changed consecutively in the main scanning direction. In at least one of the surfaces, change in the main scanning direction of the curvatures in the sub-scanning cross section is non-symmetrical with respect to the optical axis. It is preferable that the lens 6 satisfies at least one of the above mentioned conditions (1) through (5). Further, the lens 6 is an anamorphic optical system having a geometrically conjugate relation in the sub-scanning direction between the vicinity of the deflecting reflective surface of the optical deflector and the position of the scanned surface that is photosensitivity body 8. The lens 6 has a function that the optical scanning of the optical spot on the scanned surface is made to have uniform velocity and the surface inclination of the optical deflector is corrected.

Figure 2:
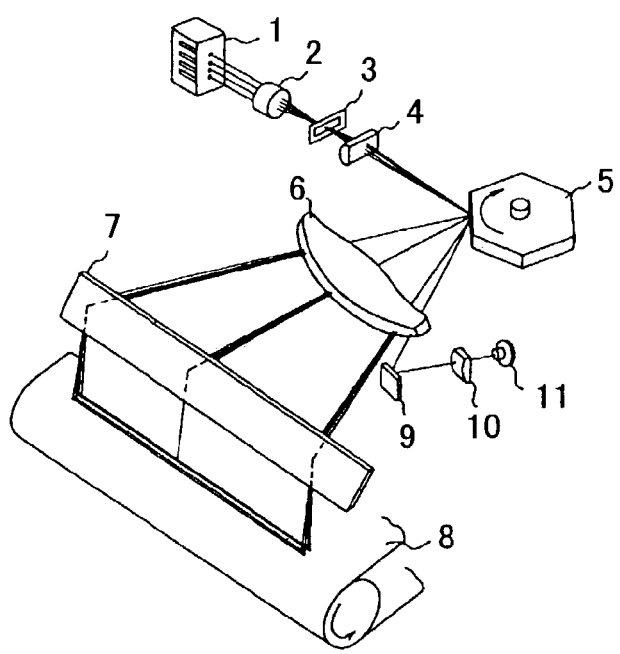
FIG. 2 is a perspective view of one preferred embodiment of a multi-beam optical scanning device of the present invention.

FIG. 2 is a perspective view of one preferred embodiment of a multi-beam optical scanning device of the present invention. In FIG. 2, parts that are the same as the parts shown in FIG. 1 are given the same reference numerals, and explanation thereof will be omitted.

In the multi-beam optical scanning device of FIG. 2, a monolithic semiconductor laser array is provided as a light source unit 1 that emits a plurality of light fluxes. The light source unit 1 includes a plurality of light emitting parts "ch1" through "ch4" and these light emitting parts are arrayed along a line at equal distance in a sub-scanning direction. The semiconductor laser array may be configured so that the light emitting parts "ch1" through "ch4" are arrayed at equal distances along a slanted line that is inclined to the sub-scanning direction. The coupling lens 2 may be individual lenses or one lens in common.

Four light fluxes emitted from the four light-emitting source ch1 through ch4 are divergent light fluxes each having an ellipse far-field pattern, the major axis of which extends in the main scanning direction, respectively. The four light fluxes emitted from the light source 1 are transformed into light flux forms suitable for a subsequent optical system by a common coupling lens 2 that is common for the four light fluxes. The light flux transformed into the suitable form by the coupling lens 2 can be parallel light flux, or weak divergent or weak convergent light flux.

The four light fluxes having passed through the coupling lens 2 are beam shaped as a result of the periphery thereof being cut by an aperture 3 when passing through an opening of the aperture 3, and then are incident on a cylindrical lens 4 which is a common line-image optical system.

The cylindrical lens 4 condenses each the incident four light fluxes in the sub-scanning direction so that line images each long in the main scanning direction and separate in the sub-scanning direction from each other are formed as a result of being thus condensed on or in the proximity of a deflection reflective surface of a polygon mirror 5 acting as the optical deflector.

The four light fluxes deflected by the deflecting reflection surface with a constant angular velocity passes through a lens 6 acting as the scanning optical system and an optical path of the light flux is bent by a bending mirror 7. As a result of this, the four light fluxes reach a photoreceptor 8 that is a substantially scanned surface as four optical spots separated in the sub-scanning direction and optically scan four scanning lines of the scanned surface simultaneously.

One of the deflected light fluxes is reflected by a mirror 9 prior to the optical scanning and is incident on a light receiving element 11 by a lens 10. Based on output from the light receiving element 11, a timing of writing beginning timing of the optical scanning of the respective four light fluxes is determined.

By the scanning optical system, the four light fluxes deflected by the beam deflector 5 at the same time condense on the scanned surface 8 as the four optical spots. The scanning optical system includes a unitary lens 6. The lens 6 of FIG. 1 is used as the lens 6 of FIG. 2. That is, the lens 6 has both surfaces having convex shapes in main scanning cross section and both surfaces having convex shapes in sub-scanning cross section. Both surfaces are anamorphic surfaces wherein power in the main scanning direction is different from power in the sub-scanning direction. The "main scanning cross section" is an imaginary plane cross section including an optical axis of a lens acting as a scanning optical system and in parallel to the main scanning direction. The "sub-scanning cross section" is an imaginary plane cross section perpendicular to the main scanning direction at any position of the main scanning direction of the lens acting as the scanning optical system.

In one case, the lens is also required to satisfy the following condition.

(1) $0.5 \leq |\beta_2| \leq 3.0$, wherein $\beta_2$ represents a lateral magnification in the sub-scanning direction at a central image height where the image height is 0.

It is preferable for the lens 6 in this embodiment to have at least one of the following conditions (2) through (5).

(2) $0.9 \leq |\beta_h/\beta_2| \leq 1.1$, where $\beta_2$ represents a lateral magnification in the sub-scanning direction at a central image height and $\beta_h$ represents a lateral magnification in the sub-scanning direction at any image height. (3) $F_S/W < 0.001$, where W represents an effective writing width and $F_S$ is a width of a sub-scanning curvature of field. The effective writing width is an optical scanning area where image writing can be implemented effectively by optical scanning. The sub-scanning curvature of field is a curvature of field in the sub-scanning direction. Furthermore, a curvature of field in the main scanning direction is called a main scanning curvature of field.

(4) $R_{m1} \geq |R_{m2}|$, where $R_{m1}$ is a curvature radius of an entering side surface in a main scanning cross section and $R_{m2}$ is a curvature radius of an emitting side surface in a main scanning cross section. In a case where configurations of the lens surface in the main scanning and sub-scanning cross sections non-arc configurations, $R_{m1}$ and $R_{m2}$ mean radii of the curvature of the paraxial axis.

(5) $|R_{S1}| \geq |R_{S2}|$, where $R_{S1}$ is a curvature radius of an entering side surface in a sub-scanning cross section and $R_{S2}$ is a curvature radius of an emitting side surface in a sub-scanning cross section. In a case where configurations of the lens surface in the main scanning and sub-scanning cross sections non-arc configurations, $R_{S1}$ and $R_{S2}$ mean radii of the curvature of the paraxial axis.

In another case, the lens 6 is also required to satisfy the above mentioned conditions (4) and (5). In this case, it is preferable for the lens 6 to have at least one of the above mentioned conditions (1) through (3).

In yet another case, both surfaces of the lens 6 are required to have non-arc configurations in the main scanning cross section. In addition, both surfaces are specific surfaces wherein curvatures in a sub-scanning cross section are changed consecutively in the main scanning direction. In at least one of the surfaces, change in the main scanning direction of the curvatures in the sub-scanning cross section is non-symmetrical with respect to the optical axis. It is preferable that the lens 6 satisfy at least one of the above mentioned conditions (1) through (5). Further, the lens 6 is an anamorphic optical system having a geometrically conjugate relation in the sub-scanning direction between the vicinity of the deflecting reflective surface of the optical deflector and the position of the scanned surface that is the photosensitivity body 8. The lens 6 has a function that the optical scanning of the optical spot on the scanned surface is made to have a uniform velocity and the surface inclination of the optical deflector is corrected.

Figure 3:
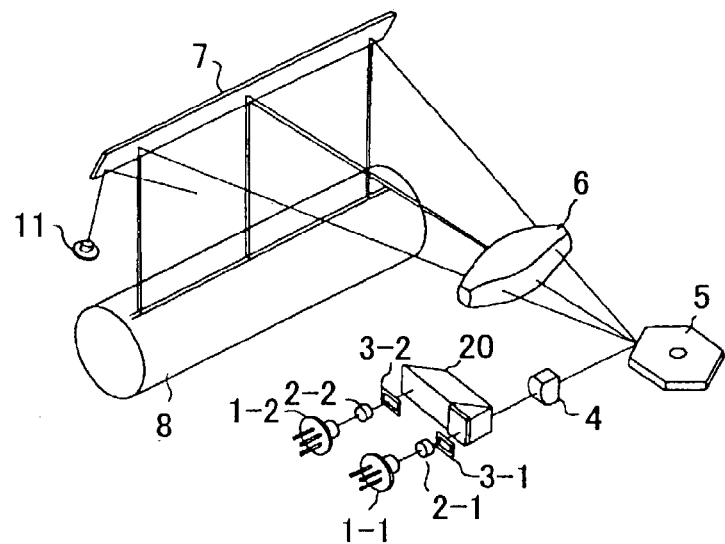
FIG. 3 is a perspective view of another preferred embodiment of a multi-beam optical scanning device of the present invention.

FIG. 3 is a perspective view of another preferred embodiment of a multi-beam optical scanning device of the present invention. The optical scanning device shown in FIG. 3 employs two light sources in a beam-combining system. In FIG. 3, parts that are the same as the parts shown in FIG. 1 are given the same reference numerals, and explanation thereof will be omitted.

Referring to FIG. 3, the light sources 1-1 and 1-2 respectively have a single emitting part. The light flux emitted from semiconductor lasers as the light sources 1-1 and 1-2 are transformed into light flux forms suitable for a subsequent optical system by coupling lenses 2-1 and 2-2, respectively. The light fluxes transformed into the suitable forms by the coupling lenses 2-1 and 2-2 can be parallel light flux, or weak divergent or weak convergent light flux.

The respective light fluxes having passed through the coupling lens 2-1 and 2-2 are beam shaped as a result of peripheries thereof being cut off by apertures 3-1 and 3-2 when passing through openings of the apertures 3-1 and 3-2, respectively, and then are incident on a beam-combining prism 20. The beam-combining prism 20 has a reflective surface, a polarization separating film, and a ½ wave length plate. The light flux from the light source 1-2 is reflected by the reflective surface and the polarization separating film of the beam combing prism 20, and exits from the beam-combining prism 20.

On the other hand, the beam from the light source 1-1 has the polarization plane thereof rotated 90 degrees by the ½ wave length plate of the beam-combining prism 20, is transmitted by the polarization separating film, and exits from the beam-combining prism. Thus, the two beams are combined. As a result of the position relationship of the light-emitting parts of the light source 1-1 and 1-2 with respect to the optical axes of the coupling lenses 2-1 and 2-2 being adjusted, the thus-combined two beams have a slight angle formed therebetween in the sub-scanning direction.

The thus-combined two beams are incident on a cylindrical lens 4 which is a common line-image forming optical system. The cylindrical lens 4 condenses each the incident two beams in the sub-scanning direction so that two line images each long in the main scanning direction and separate in the sub-scanning direction from each other are formed as a result of thus being condensed on or in proximity of a deflection reflective surface of a polygon mirror 5 which is an optical deflector.

The two light fluxes deflected by the deflecting reflection surface at a uniform angular velocity pass through a unitary lens 6 acting as the scanning optical system and an optical path of the light flux is bent by a bending mirror 7. As a result of this, the two light fluxes reach the photoreceptor 8 that is a substantially scanned surface as two optical spots separated in the sub-scanning direction and optically scan two scanning lines of the scanned surface simultaneously.

One of the light fluxes is condensed in a beam receiving element 11 prior to the optical scanning. Based on output from the beam receiving element 11, writing beginning timings of the optical scanning of the two light fluxes are determined. Alternatively, each of the two light fluxes may be condensed in the beam receiving element 11 prior to the optical scanning. Based on output from the beam receiving element 11, a timing of starting writing of the optical scanning of each of the two light fluxes may be determined individually.

By the scanning optical system, the light fluxes deflected by the beam deflector 5 simultaneously are condensed on the scanned surface 8 as two optical spots. The scanning optical system includes the unitary lens 6. The lens 6 of FIGS. 1 and 2 is used as the lens 6 of FIG. 3.

That is, the lens 6 has both surfaces having convex shapes in main scanning cross section and both surfaces having convex shapes in sub-scanning cross section. Both surfaces are anamorphic surfaces wherein power in the main scanning direction is different from power in the sub-scanning direction. The "main scanning cross section" is an imaginary plane cross section including an optical axis of a lens acting as a scanning optical system and in parallel to the main scanning direction. The "sub-scanning cross section" is an imaginary plane cross section perpendicular to the main scanning direction at any position of the main scanning direction of the lens acting as the scanning optical system.

In one case, the lens is also required to satisfy the following condition.

(1) $0.5 \leq |\beta_2| \leq 3.0$, wherein $\beta_2$ represents a lateral magnification in the sub-scanning direction at a central image height where the image height is 0.

It is preferable for the lens 6 in this embodiment to have at least one of the following conditions (2) through (5).

(2) $0.9 \leq \beta_h/\beta_2 \leq 1.1$, where $\beta_2$ represents a lateral magnification in the sub-scanning direction at a central image height and $\beta_h$ represents a lateral magnification in the sub-scanning direction at any image height.

(3) $F_S/W < 0.001$, where W represents an effective writing width and $F_S$ is a width of a sub-scanning curvature of field. The effective writing width is an optical scanning area where image writing can be implemented effectively by optical scanning. The sub-scanning curvature of field is a curvature of an field in the sub-scanning direction. Furthermore, a curvature of field in the main scanning direction is called a main scanning curvature of field.

(4) $|R_{m1}| \geq |R_{m2}|$, where $R_{m1}$ is a curvature radius of an entering side surface in a main scanning cross section and $R_{m2}$ is a curvature radius of an emitting side surface in a main scanning cross section. In a case where configurations of the lens surface in the main scanning and sub-scanning cross sections are non-arc configurations, $R_{m1}$ and $R_{m2}$ mean radii of the curvature of the paraxial axis.

(5) $|R_{S1}| \geq |R_{S2}|$, where $R_{S1}$ is a curvature radius of an entering side surface in a sub-scanning cross section and $R_{S2}$ is a curvature radius of an emitting side surface in a sub-scanning cross section. In a case where configurations of the lens surface in the main scanning and sub-scanning cross sections are non-arc configurations, $R_{S1}$ and $R_{S2}$ mean radii of the curvature of the paraxial axis.

In another case, the lens 6 is required to satisfy the above mentioned conditions (4) and (5). In this case, it is preferable for the lens 6 to have at least one of the above mentioned conditions (1) through (3).

In yet another case, both surfaces of the lens 6 are required to have non-arc configurations in the main scanning cross section. In addition, both surfaces are specific surfaces wherein curvatures in the sub-scanning cross section are changed consecutively in the main scanning direction. In at least one of the surfaces, change in the main scanning direction of the curvatures in the sub-scanning cross section is non-symmetrical with respect to the optical axis. It is preferable that the lens 6 satisfy at least one of the above mentioned conditions (1) through (5). Further, the lens 6 is an anamorphic optical system having a geometrically conjugate relation in the sub-scanning direction between the vicinity of the deflecting reflective surface of the optical deflector and the position of the scanned surface that is the photosensitivity body 8. The lens 6 has a function that the optical scanning of the optical spot on the scanned surface is made to have a uniform velocity and the surface inclination of the optical deflector is corrected.

For achieving a very small beam spot diameter, the beam spot diameter of the beam spot on the scanned surface is defined with an intensity $1/e^2$ in a Line Spread function of light intensity distribution in the beam spot.

For the Line Spread function, when a center coordinate of the beam spot formed on the scanned surface is used as a reference, and coordinates in the main and sub-scanning directions are Y, Z and the light intensity distribution of the beam spot is f(Y, Z), the line spread function LSZ in direction Z is defined with $LSZ(Z)=f(Y,Z)dY$ (integration is performed on the entire width of the beam spot in direction Y), and the line spread function LSY in direction Y is defined with $LSZ(Y)=f(Y,Z)dZ$ (integration is performed on the entire width of the beam spot in direction Z)

These line spread functions LSZ(Z), LSY(Y) generally have substantial Gaussian distribution type shapes, and the beam spot diameters in directions Y, Z of an area of these line spread functions LSZ(Z), LSY(Y) have maximum values of about $1/e^2$ or more.

The beam spot diameter defined by the line spread functions as described above can easily be measured by scanning the beam spot via a slit at a uniform velocity, receiving light passed through the slit with an optical deflector, and integrating a received light amount. An apparatus for performing such measurement is well known.

Figure 4:
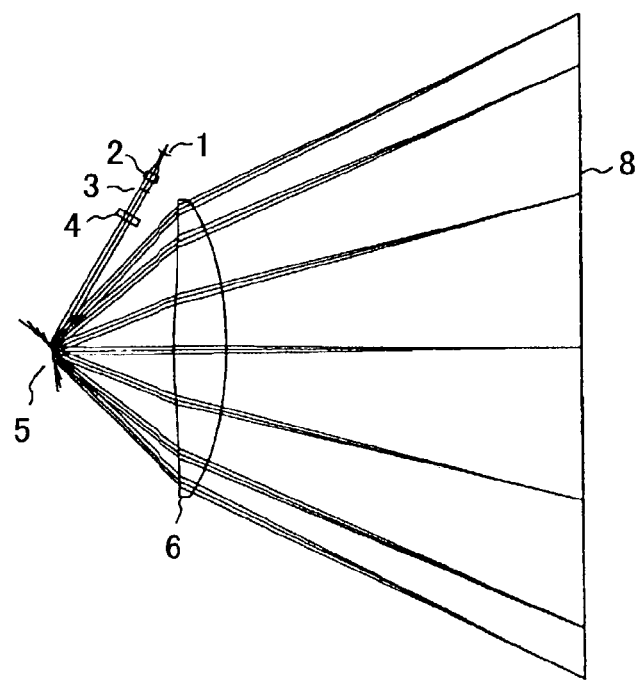
FIG. 4 is a perspective view showing an optical arrangement of the optical scanning device using the scanning optical system of the present invention.

Next, two specific examples with regard to the scanning optical system will be described Optical arrangement as the optical scanning device is shown in FIG. 4.

The shape of a lens surface will be expressed by the following expressions in each example.

A non-arc shape in the main scanning cross section is expressed by the following polynominal (6) using a radius Rm of paraxial curvature, a distance Y in the main scanning direction from the optical axis, a conical constant K, high order coefficients $A_1, A_2, A_3, A_4, A_5, \ldots A_6$, a depth X in the direction of optical axis:

$$X=(Y^2/R_m)/[1+\sqrt{\{1-(1+K_m)(Y/R_m)^2\}}]+A_1Y+A_2Y^2+A_3Y^3+A_4Y^4+A_5Y^5+A_6Y^6 \quad (6)$$

In the polynominal (6), when any of the odd-order coefficients $A_1, A_3, A_5, \ldots$ has a value other than 0, the non-arc shape is asymmetrical in the main scanning direction.

The curvature in the sub-scanning section is expressed by the following expression (7) when the curvature in the sub-scanning cross section varies in the main scanning direction (expressed by coordinate Y assuming the position of optical axis as the origin):

$$C_S(Y)=\{1/R_S(0)\}+B_1Y+B_2Y^2+B_3Y^3+B_4Y^4+B_5Y^5+B_6Y^6 \quad (7)$$

where $R_S(0)$ denotes a radius of curvature in the sub-scanning cross section on the optical axis (Y=0)'. In the expression (7), when any of the odd-order coefficients $B_1, B_3, B_5, \ldots$ has a value other than 0, the curvature in a sub-scanning cross section varies asymmetrically in the main scanning direction.

Analyzing expressions of the specific surface and a surface configuration are not limited to the above mentioned expressions and configurations, but variations and modifications may be made.

An example 1 according to the present invention will now be described. Data concerning the example 1 is as follows:

the wavelength of the light source: 655 nm;

the focal length of the coupling lens: 15 mm;

the coupling function of the coupling lens: convergent function;

Natural condense point, that is a position where a convergent light flux exiting from the coupling lens is condensed naturally in a case of no effect of a refractive function of other optical elements, is positioned at 464.73 mm from the deflection reflective surface toward the scanned surface;

the focal length in the sub-scanning direction of the cylindrical lens: 72 mm; and the polygon mirror: the number of the deflection reflective surfaces: 6, the radius of inscribed circle: 18 mm, the angle formed between the entering angle of the beam from the side of the light source and the optical axis of the scanning optical system: 60 degrees;

Data concerning the optical system disposed between the polygon mirror and the surface to be scanned will now be described.

In the table below, $R_m$ denotes the radius of curvature in the main scanning direction, $R_s$ denotes the radius of curvature in the sub-scanning direction, and n denotes the refractive index. Each of $R_m$ and $R_s$ in the following data is a radius of paraxial curvature.

| Surface No. i | $R_{mi}$ | $R_{si}(0)$ | X | Y | n |
|---|---|---|---|---|---|
| Deflection Reflective Surface | 0 | ∞ | ∞ | 50.00 | −0.15 | |
| Lens 6 | 1 | 216.47 | 139.01 | 17.03 | 0 | 1.52724 |
| | 2 | −172.38 | −25.21 | 70.02 | 0 | |

In the table above, X denotes an interval in the optical direction of top points between the surface number of i and i+1. Y denotes an interval in the main scanning direction of tops between the surface number of i and i+1. For example, "X=50.00, Y=−0.15" at the surface number of 0, namely the deflection reflective surface, denotes that a top point of the entering surface of the lens 6 (surface number: 1) is apart 50.00 mm in the optical direction (X direction) and 0.15 mm in a minus direction (a side of starting of the optical scanning) of the main scanning direction (Y direction) from a position of a deflection reflective point (a reflection position where image height: 0 is given). The width at the optical axis of the lens 6 is given in a case of X=17.03 at the surface number: 1.

An entering side surface (surface number: 1) is a specific surface, represented by the above mentioned formula (7), wherein the curvature in the sub-scanning cross section is changed against the optical axis asymmetrically in the main scanning direction. A configuration in the main scanning cross section is a non-arc configuration represented by the above mentioned formula (6) and symmetrical with respect to the optical axis.

The values of the coefficients for the main scanning direction and sub-scanning direction of this surface are shown in the following table 1.

TABLE 1

| Surface No. | Coefficients for Main scanning Direction | | Coefficients for Sub-scanning Direction | |
|---|---|---|---|---|
| 1 | K | −6.952 × 10 | $B_1$ | 7.268 × 10$^{-6}$ |
| | $A_1$ | 0 | $B_2$ | 2.379 × 10$^{-6}$ |
| | $A_2$ | 0 | $B_3$ | 3.877 × 10$^{-9}$ |
| | $A_3$ | 0 | $B_4$ | −5.077 × 10$^{-10}$ |
| | $A_4$ | −1.252 × 10$^{-7}$ | $B_5$ | −3.115 × 10$^{-12}$ |
| | $A_5$ | 0 | $B_6$ | −9.603 × 10$^{-14}$ |
| | $A_6$ | −2.106 × 10$^{-11}$ | $B_7$ | 6.152 × 10$^{-16}$ |
| | $A_7$ | 0 | $B_8$ | 2.418 × 10$^{-17}$ |
| | $A_8$ | 1.732 × 10$^{-14}$ | $B_9$ | |
| | $A_9$ | 0 | $B_{10}$ | |
| | $A_{10}$ | −2.520 × 10$^{-18}$ | $B_{11}$ | |

TABLE 1-continued

| Surface No. | Coefficients for Main scanning Direction | | Coefficients for Sub-scanning Direction | |
|---|---|---|---|---|
| | $A_{11}$ | | $B_{12}$ | |
| | $A_{12}$ | 9.572 × 10$^{-24}$ | $B_{13}$ | |
| | $A_{13}$ | | $B_{14}$ | |

Exit side surface (surface number: i=2) is a specific surface, wherein the curvature in the sub-scanning cross section is changed against the optical axis symmetrically (any of the odd-order coefficients $B_1$, $B_3$, $B_5$, ... has a value of 0) in the main scanning direction. A configuration in the main scanning cross section is a non-arc configuration and symmetrical against the optical axis.

The values of the coefficients for the main scanning direction and sub-scanning direction of this surface are shown in the following table 2.

TABLE 2

| Surface No. | Coefficients for Main scanning Direction | | Coefficients for Sub-scanning Direction | |
|---|---|---|---|---|
| 2 | K | 6.273 | $B_1$ | 0 |
| | $A_1$ | 0 | $B_2$ | 5.835 × 10$^{-6}$ |
| | $A_2$ | 0 | $B_3$ | 0 |
| | $A_3$ | 0 | $B_4$ | −1.099 × 10$^{-9}$ |
| | $A_4$ | −4.002 × 10$^{-7}$ | $B_5$ | 0 |
| | $A_5$ | 0 | $B_6$ | 2.216 × 10$^{-13}$ |
| | $A_6$ | 1.279 × 10$^{-10}$ | $B_7$ | 0 |
| | $A_7$ | 0 | $B_8$ | −4.052 × 10$^{-17}$ |
| | $A_8$ | −3.237 × 10$^{-14}$ | $B_9$ | |
| | $A_9$ | 0 | $B_{10}$ | |
| | $A_{10}$ | 7.026 × 10$^{-18}$ | $B_{11}$ | |
| | $A_{11}$ | | $B_{12}$ | |
| | $A_{12}$ | −8.662 × 10$^{-24}$ | $B_{13}$ | |
| | $A_{13}$ | | $B_{14}$ | |

In the example 1, $|\beta_2|$ that is a lateral magnification in the sub-scanning direction at a central image height where the image height is 0 of the scanning optical system is as follows.

$\beta_2 = 1.86$.

Figure 5:
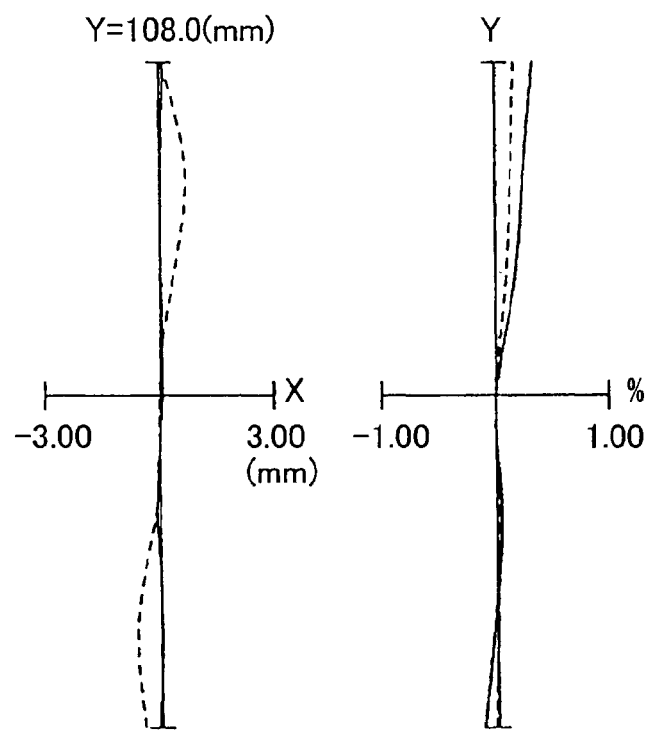
FIG. 5 is a view showing a curvature of field (in the left figure: the solid line for the sub-scanning direction; the broken line for the main scanning direction) and a uniform-velocity characteristic (in the right figure: the solid line for linearity; the broken line for the fθ characteristic), of example 1 of the first embodiment.

FIG. 5 shows, with regard to the example 1, the curvature of field (in the left figure: the solid line for the sub-scanning direction; the broken line for the main scanning direction) and the uniform-velocity characteristics (in the right figure: the solid line for linearity; the broken line for the fθ characteristic).

The width of curvature in the main scanning direction is 1.27 mm/216 mm. The width of curvature in the sub-scanning direction is 0.210 mm/216 mm. The linearity of the uniform-velocity characteristic is 0.47%/216 mm. Accordingly, both curvature of field and uniform-velocity characteristics are very well corrected. The sub-scanning curvature of field satisfies the above mentioned condition (3). That is:

$$0.210/216 = 0.00097 < 0.001 \tag{3}$$

Figure 6:
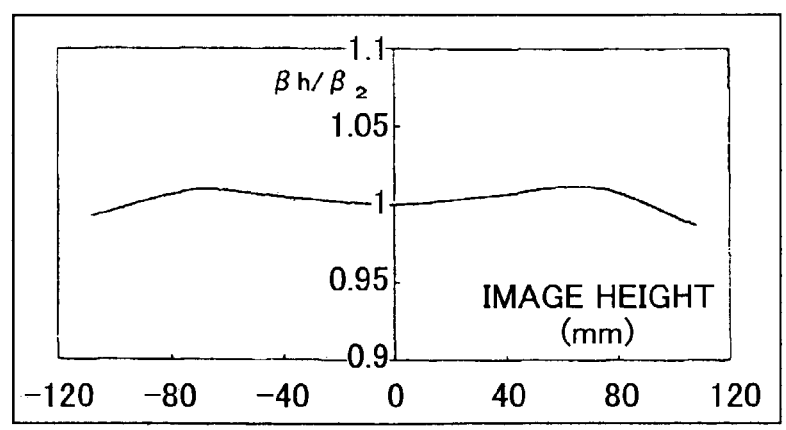
FIG. 6 is a view showing change of the lateral magnification $\beta_h$ in the sub-scanning direction at any image height with respect to the lateral magnification $\beta_2$ in the sub-scanning direction at the central image height of example 1 of the first embodiment.

FIG. 6 shows change of the lateral magnification $\beta_h$ in the sub-scanning direction at any image height with respect to the lateral magnification $\beta_2$ in the sub-scanning direction at the central image height in the example 1. As a result, $$0.987 \leq |\beta_h/\beta_2| \leq 1.010 \tag{2}$$

Accordingly, the magnification change satisfies the above mentioned condition (2), and is very well corrected.

Figure 7:
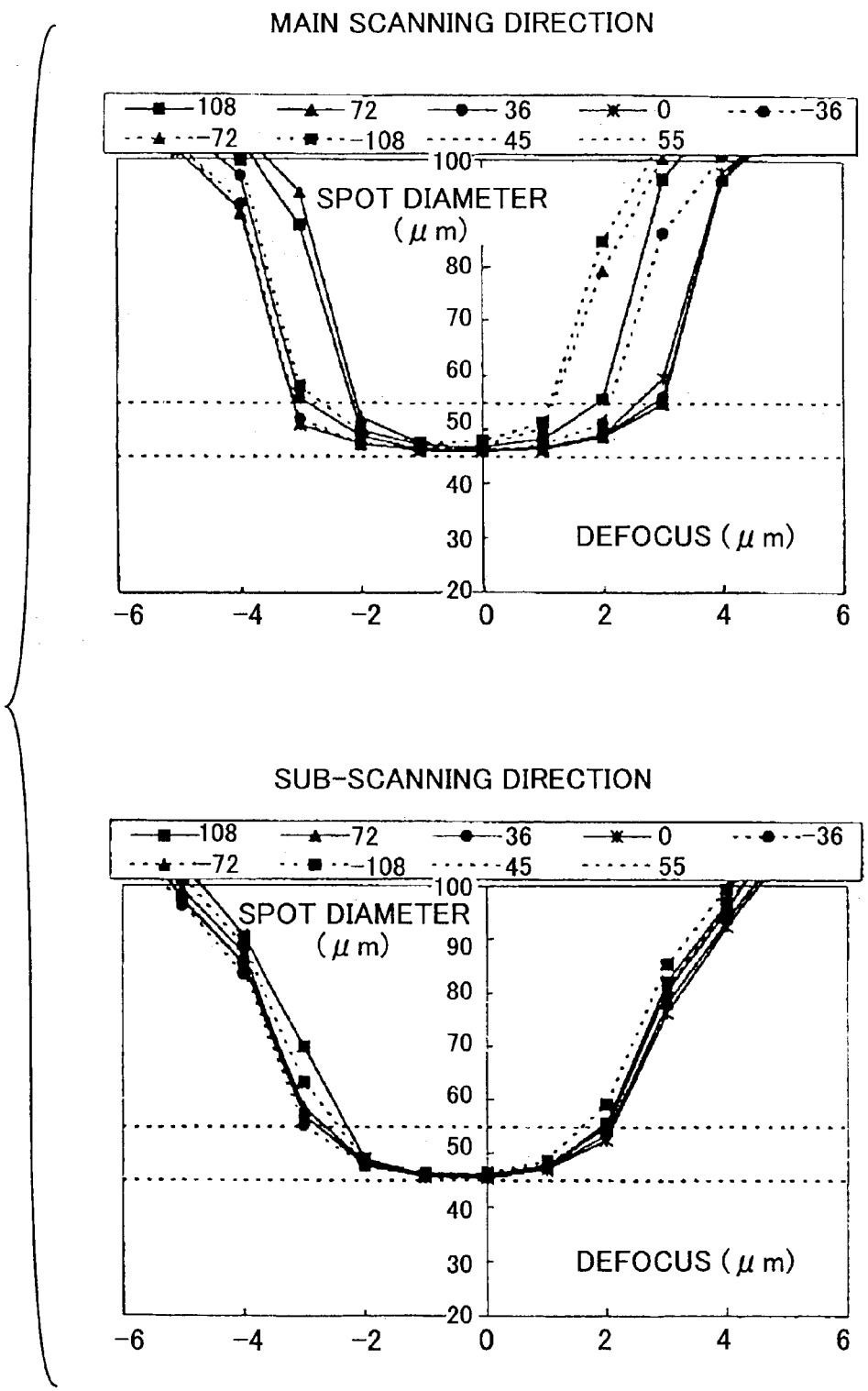
FIG. 7 is a view showing depth curves of spot diameter (change of spot diameter with respect to defocus of beam spot) for each image height of beam spot of example 1 of the first embodiment.

FIG. 7 shows depth curves of spot diameter (change of spot diameter with respect to defocus of beam spot) for each image height of the beam spot in the example 1. FIG. 7-(a) is for the main scanning direction while FIG. 7-(b) is for the sub-scanning direction. In the example 1, the order of 50 μm is targeted as the spot diameter defined by the $1/e^2$ intensity of the Line Spread function. As shown in the figures, satisfactory depths are provided for both the main and sub-scanning directions. Accordingly, an allowance for positional accuracy on the surface to be scanned is large.

An example 2 according to the present invention will now be described. Data concerning the example 2 is as follows:
the wavelength of the light source: 655 nm;
the focal length of the coupling lens: 15 mm;
the coupling function of the coupling lens: convergent function;
Natural condense point is positioned at 686.76 mm from the deflection reflective surface toward the scanned surface;
the focal length in the sub-scanning direction of the cylindrical lens: 72 mm; and
the polygon mirror: the number of the deflection reflective surfaces: 6, the radius of inscribed circle: 16 mm, the angle formed between the entering angle of the beam from the side of the light source and the optical axis of the scanning optical system: 60 degrees;

Data concerning the optical system disposed between the polygon mirror and the surface to be scanned will now be described.

In the table below, $R_m$ denotes the radius of curvature in the main scanning direction, $R_m$ denotes the radius of curvature in the sub-scanning direction, and n denotes a refractive index. Each of $R_m$ and $R_s$ in the following data is a radius of paraxial curvature.

| | Surface No. i | $R_{mi}$ | $R_{si}(0)$ | X | Y | n |
|---|---|---|---|---|---|---|
| Deflection Reflective Surface | 0 | ∞ | ∞ | 47.89 | 0.74 | |
| Lens 6 | 1 | 235.61 | 131.69 | 20.81 | 0 | 1.53048 |
| | 2 | −165.83 | −25.78 | 139.89 | 0 | |

An entering side surface (surface number: 1)

is a specific surface wherein the curvature in the sub-scanning cross section are changed against the optical axis asymmetrically in the main scanning direction. A configuration in the main scanning cross section is a non-arc configuration represented by the above mentioned formula (6) and symmetrical with respect to the optical axis. The values of the coefficients for the main scanning direction and sub-scanning direction of this surface are shown in the following table 3.

TABLE 3

| Surface No. | | Coefficients for Main scanning Direction | | Coefficients for Sub-scanning Direction |
|---|---|---|---|---|
| 1 | K | −9.219 × 10 | $B_1$ | 4.437 × 10⁻⁶ |
| | $A_1$ | 0 | $B_2$ | 2.448 × 10⁻⁶ |
| | $A_2$ | 0 | $B_3$ | 4.418 × 10⁻⁹ |
| | $A_3$ | 0 | $B_4$ | −8.078 × 10⁻¹⁰ |
| | $A_4$ | −1.922 × 10⁻⁷ | $B_5$ | −2.889 × 10⁻¹² |
| | $A_5$ | 0 | $B_6$ | −9.206 × 10⁻¹⁴ |

TABLE 3-continued

| Surface No. | | Coefficients for Main scanning Direction | | Coefficients for Sub-scanning Direction |
|---|---|---|---|---|
| | $A_6$ | −1.591 × 10⁻¹¹ | $B_7$ | 5.328 × 10⁻¹⁶ |
| | $A_7$ | 0 | $B_8$ | 2.724 × 10⁻¹⁷ |
| | $A_8$ | 1.865 × 10⁻¹⁴ | $B_9$ | |
| | $A_9$ | 0 | $B_{10}$ | |
| | $A_{10}$ | −1.977 × 10⁻¹⁸ | $B_{11}$ | |
| | $A_{11}$ | 0 | $B_{12}$ | |
| | $A_{12}$ | 1.842 × 10⁻²² | $B_{13}$ | |
| | $A_{13}$ | 0 | $B_{14}$ | |
| | $A_{14}$ | −8.969 × 10⁻²⁶ | $B_{15}$ | |

The exit side surface (surface number: i = 2)

is a specific surface wherein the curvature in the sub-scanning cross section is changed against the optical axis symmetrically in the main scanning direction. The configuration in the main scanning cross section is a non-arc configuration and symmetrical again the optical axis.

The values of the coefficients for the main scanning direction and sub-scanning direction of this surface are shown in the following table 4.

TABLE 4

| Surface No. | | Coefficients for Main scanning Direction | | Coefficients for Sub-scanning Direction |
|---|---|---|---|---|
| 2 | K | 5.790 | $B_1$ | 0 |
| | $A_1$ | 0 | $B_2$ | 5.366 × 10⁻⁶ |
| | $A_2$ | 0 | $B_3$ | 0 |
| | $A_3$ | 0 | $B_4$ | −1.100 × 10⁻⁹ |
| | $A_4$ | −3.635 × 10⁻⁷ | $B_5$ | 0 |
| | $A_5$ | 0 | $B_6$ | 1.807 × 10⁻¹³ |
| | $A_6$ | 1.196 × 10⁻¹⁰ | $B_7$ | 0 |
| | $A_7$ | 0 | $B_8$ | −4.194 × 10⁻¹⁷ |
| | $A_8$ | −3.500 × 10⁻¹⁴ | $B_9$ | |
| | $A_9$ | 0 | $B_{10}$ | |
| | $A_{10}$ | 7.781 × 10⁻¹⁸ | $B_{11}$ | |
| | $A_{11}$ | 0 | $B_{12}$ | |
| | $A_{12}$ | 2.236 × 10⁻²² | $B_{13}$ | |
| | $A_{13}$ | 0 | $B_{14}$ | |
| | $A_{14}$ | −1.454 × 10⁻²⁶ | $B_{15}$ | |

In the example 1, $\beta_2$ that is a lateral magnification in the sub-scanning direction at a central image height where the image height is 0 of the scanning optical system is as follows.

$\beta_2 = 2.23$.

Figure 8:
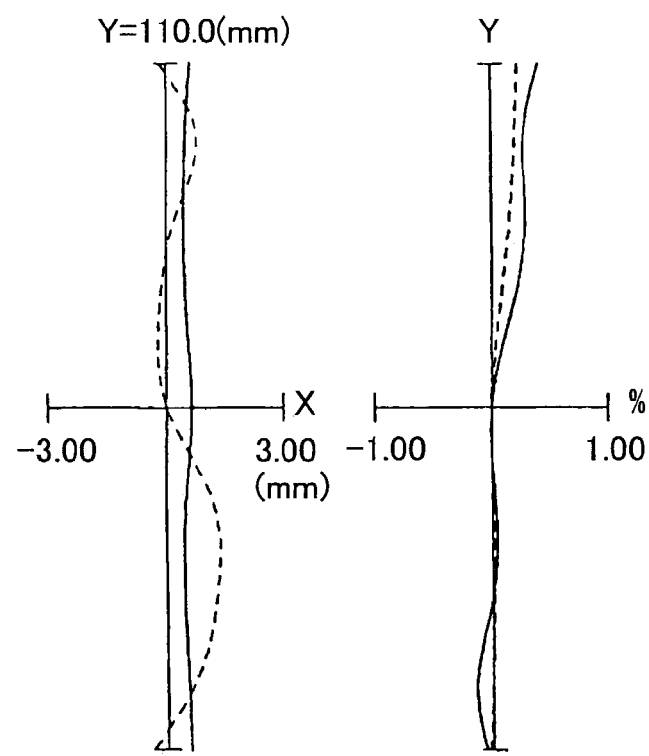
FIG. 8 is a view showing a curvature of field (in the left figure: the solid line for the sub-scanning direction; the broken line for the main scanning direction) and a uniform-velocity characteristics (in the right figure: the solid line for the linearity; the broken line for the fθ characteristic), of example 2 of the first embodiment.

FIG. 8 shows, with regard to the example 2, the curvature of field (in the left figure: the solid line for the sub-scanning direction; the broken line for the main scanning direction) and the uniform-velocity characteristics (in the right figure: the solid line for the linearity; the broken line for the fθ characteristic).

The width of curvature in the main scanning direction is 1.666 mm/220 mm. The width of curvature in the sub-scanning direction is 0.152 mm/220 mm. The linearity of the uniform-velocity characteristic is 0.555%/220 mm. Accordingly, both curvature of field and uniform-velocity characteristics are very well corrected. The sub-scanning curvature of field satisfies the above mentioned condition (3). That is:

$$0.152/220 = 0.00074 < 0.001 \tag{3}$$

Figure 9:
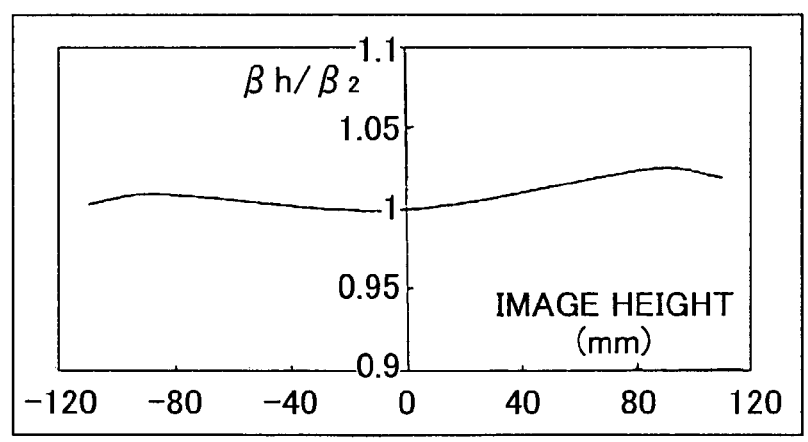
FIG. 9 is a view showing change of the lateral magnification $\beta_h$ in the sub-scanning direction at any image height with respect to the lateral magnification $\beta_2$ in the sub-scanning direction at the central image height in example 2 of the first embodiment.

FIG. 9 shows change of the lateral magnification $\beta_h$ in the sub-scanning direction at any image height with respect to the lateral magnification $\beta_2$ in the sub-scanning direction at the central image height in the example 2. As a result, $$1.000 \leq |\beta_H/\beta_2| \leq 1.020 \tag{2}$$

Accordingly, the magnification change satisfies the above mentioned condition (2), and is very well corrected.

Figure 10:
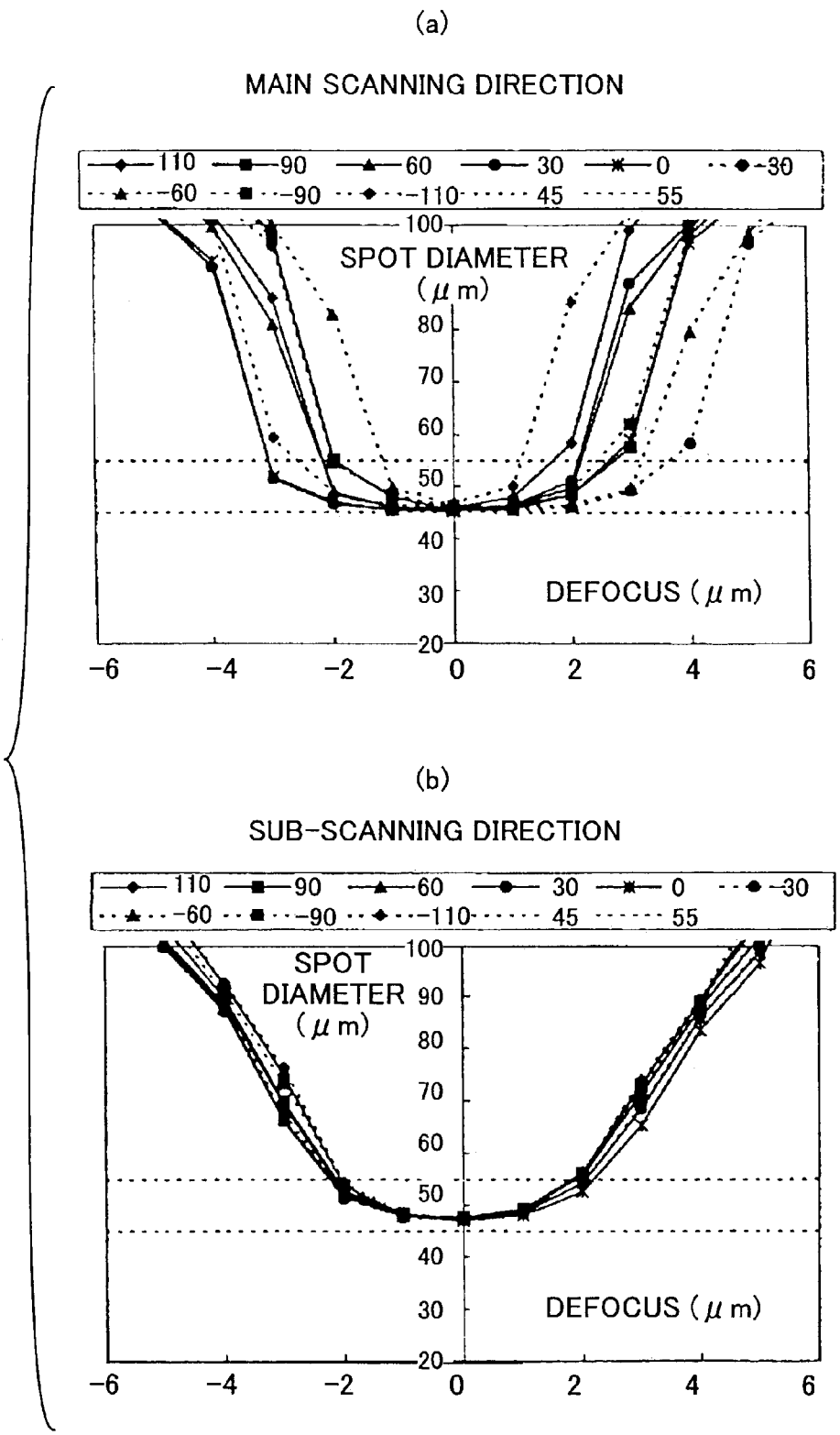
FIG. 10 is a view showing depth curves of spot diameter (change of spot diameter with respect to defocus of beam spot) for each image height of beam spot in example 2 of the first embodiment.

FIG. 10 shows depth curves of spot diameter (change of spot diameter with respect to defocus of beam spot) for each image height of beam spot in the example 1. FIG. 10-(a) is for the main scanning direction while FIG. 10-(b) is for the sub-scanning direction. In the example 2, the order of 50 μm is targeted as the spot diameter defined by the $1/e^2$ intensity of the Line Spread function. As shown in the figures, satisfactory depths are provided for both the main and sub-scanning directions. Accordingly, an allowance for positional accuracy on the surface to be scanned is large.

In the above mentioned example, the lens 6 acting as the scanning optical system is made of a plastic material. A glass material may be also used for the lens 6. In addition, in order to make the diameter of the beam spot even smaller, the configuration in the sub-scanning cross section may be a non-arc configuration. Furthermore, it is possible to implement aberration correction preferably by making the scanning optical system eccentric.

Second Embodiment

In the second embodiment, parts that are the same as the parts shown in the first embodiment are given the same reference numerals, and explanation thereof will be omitted, and only different parts from the parts in the first embodiment will be described.

First, a single beam optical scanning device of the second embodiment will be described with reference to FIG. 1.

In the second embodiment, by the scanning optical system, the light flux deflected by the beam deflector 5 condenses on the scanned surface 8 as the optical spot. The scanning optical system includes a unitary lens 6. The lens 6 has both surfaces having convex shapes in main scanning cross section and both surfaces having convex shapes in sub-scanning cross section.

As the scanning optical system, the system satisfing the above mentioned condition (1) is used. Furthermore, in this embodiment, the lens 6 is configured as an anamorphic optical system having a geometrically conjugate relation in the sub-scanning direction between the vicinity of the deflecting reflective surface of the optical deflector and the photosensitive body that is the scanned surface. In addition, in this embodiment, a curvature constant surface is applied to one surface of the lens 6 and a specific surface is applied to the other surface of the lens 6. In the specific surface, the change against the optical axis in the main scanning direction of the curvature in the sub-scanning cross section is asymmetrical and the above mentioned conditions (2) through (5) are satisfied.

Next, a multi-beam optical scanning device of the second embodiment will be described with reference to FIG. 2.

In the second embodiment, by the scanning optical system, the four light fluxes deflected by the beam deflector 5 condense on the scanned surface 8 as four optical spots. The scanning optical system includes a unitary lens 6. The lens 6 of FIG. 1 is used as the lens 6 of FIG. 2. That is, the lens 6 has both surfaces having convex shapes in main scanning cross section and both surfaces having convex shapes in sub-scanning cross section.

As the scanning optical system, the system satisfing the above mentioned condition (1) is used. Furthermore, in this embodiment, the lens 6 is configured as an anamorphic optical system having a geometrically conjugate relation in the sub-scanning direction between the vicinity of the deflecting reflective surface of the optical deflector and the photosensitive body that is the scanned surface. In addition, in this embodiment, a curvature constant surface is applied to one surface of the lens 6 and a specific surface is applied to the other surface of the lens 6. In the specific surface, the change against the optical axis in the main scanning direction of the curvature in the sub-scanning cross section is asymmetrical and the above mentioned conditions (2) through (5) are satisfied.

Next, another preferred embodiment of a multi-beam optical scanning device of the second embodiment will be described with reference to FIG. 3.

As well as the optical scanning devices of FIGS. 1 and 2 in this second embodiment, a curvature constant surface is applied to one surface of the lens 6 and a specific surface is applied to the other surface of the lens 6. In the specific surface, the change against the optical axis in the main scanning direction of the curvature in the sub-scanning cross section is asymmetrical and the above mentioned conditions (2) through (5) are satisfied.

Next, a specific example with regard to the scanning optical system will be described. Optical arrangement as the optical scanning device is shown in FIG. 4.

An example 1 according to the present invention will now be described. Data concerning the example 1 is as follows:

the wavelength of the light source: 655 nm;

the focal length of the coupling lens: 15 mm;

the coupling function of the coupling lens: convergent function;

Natural condense point, that is a position where a convergent light flux exiting from the coupling lens is condensed naturally in a case of no effect of a refractive function of other optical elements, is positioned at 686.76 mm from the deflection reflective surface toward the scanned surface;

the focal length in the sub-scanning direction of the cylindrical lens: 72 mm; and the polygon mirror: the number of the deflection reflective surfaces: 6, the radius of inscribed circle: 16 mm, the angle formed between the entering angle of the beam from the side of the light source and the optical axis of the scanning optical system: 60 degrees;

Data concerning the optical system disposed between the polygon mirror and the surface to be scanned will now be described.

In the table below, $R_m$ denotes a radius of curvature in the main scanning direction, $R_s$ denotes a radius of curvature in the sub-scanning direction, and n denotes a refractive index. Each of $R_m$ and $R_s$ in the following data is a radius of paraxial curvature.

| Surface No. i | $R_{mi}$ | $R_{si}(0)$ | X | Y | n |
|---|---|---|---|---|---|
| Deflection Reflective Surface 0 | ∞ | ∞ | 47.89 | 0.74 | |
| Lens 6  1 | 235.61 | 196.82 | 20.81 | 0 | 1.53048 |
| 2 | −165.83 | −24.28 | 139.89 | 0 | |

In the table above, X denotes an interval in the optical direction of top points between the surface number of i and i+1. Y denotes an interval in the main scanning direction of tops between the surface number of i and i+1. For example, "X=47.89, Y=0.74" at the surface number of 0, namely the deflection reflective surface, denotes that a top point of the entering surface of the lens 6 (surface number: 1) is apart 47.89 mm in the optical direction (X direction) and 0.74 mm in the main scanning direction (Y direction) from the position of a deflection reflective point (a reflection position where image height: 0 is given). The width at the optical axis of the lens 6 is given it a case of X=20.81 at the surface number: 1.

The entering side surface (surface number: 1) is a curvature constant surface and the configuration in the main scanning cross section is a non-arc configuration represented by the above mentioned formula (6).

The values of the coefficients for the main scanning direction and sub-scanning direction of this surface are shown in the following table 5.

TABLE 5

| Surface No. | Coefficients for Main scanning Direction | | Coefficients for Sub-scanning Direction |
|---|---|---|---|
| 1 | K | $-9.219 \times 10$ | $B_1$ |
| | $A_1$ | 0 | $B_2$ |
| | $A_2$ | 0 | $B_3$ |
| | $A_3$ | 0 | $B_4$ |
| | $A_4$ | $-1.922 \times 10^{-7}$ | $B_5$ |
| | $A_5$ | 0 | $B_6$ |
| | $A_6$ | $-1.591 \times 10^{-11}$ | $B_7$ |
| | $A_7$ | 0 | $B_8$ |
| | $A_8$ | $1.865 \times 10^{-14}$ | $B_9$ |
| | $A_9$ | 0 | $B_{10}$ |
| | $A_{10}$ | $-1.977 \times 10^{-18}$ | $B_{11}$ |
| | $A_{11}$ | 0 | $B_{12}$ |
| | $A_{12}$ | $1.842 \times 10^{-22}$ | $B_{13}$ |
| | $A_{13}$ | 0 | $B_{14}$ |
| | $A_{14}$ | $-8.969 \times 10^{-26}$ | $B_{15}$ |

The exit side surface (surface number: i = 2)

is a specific surface, wherein the configuration in the main scanning cross section is a non-arc configuration and symmetrical against the optical axis.

The values of the coefficients for the main scanning direction and sub-scanning direction of this surface are shown in the following table 6.

TABLE 6

| Surface No. | Coefficients for Main scanning Direction | | Coefficients for Sub-scanning Direction | |
|---|---|---|---|---|
| 2 | K | 5.790 | $B_1$ | $-2.192 \times 10^{-6}$ |
| | $A_1$ | 0 | $B_2$ | $3.902 \times 10^{-6}$ |
| | $A_2$ | 0 | $B_3$ | $-2.660 \times 10^{-9}$ |
| | $A_3$ | 0 | $B_4$ | $-1.246 \times 10^{-9}$ |
| | $A_4$ | $-3.635 \times 10^{-7}$ | $B_5$ | $3.514 \times 10^{-13}$ |
| | $A_5$ | 0 | $B_6$ | $1.901 \times 10^{-13}$ |
| | $A_6$ | $1.196 \times 10^{-10}$ | $B_7$ | |
| | $A_7$ | 0 | $B_8$ | |
| | $A_8$ | $-3.500 \times 10^{-14}$ | $B_9$ | |
| | $A_9$ | 0 | $B_{10}$ | |
| | $A_{10}$ | $7.781 \times 10^{-18}$ | $B_{11}$ | |
| | $A_{11}$ | 0 | $B_{12}$ | |
| | $A_{12}$ | $2.236 \times 10^{-22}$ | $B_{13}$ | |
| | $A_{13}$ | 0 | $B_{14}$ | |
| | $A_{14}$ | $-1.454 \times 10^{-26}$ | $B_{15}$ | |

In the example 1, $|\beta_2|$ that is a lateral magnification in the sub-scanning direction at a central image height where the image height is 0 of the scanning optical system is as follows.

$\beta_2 = 2.3$

Figure 11:
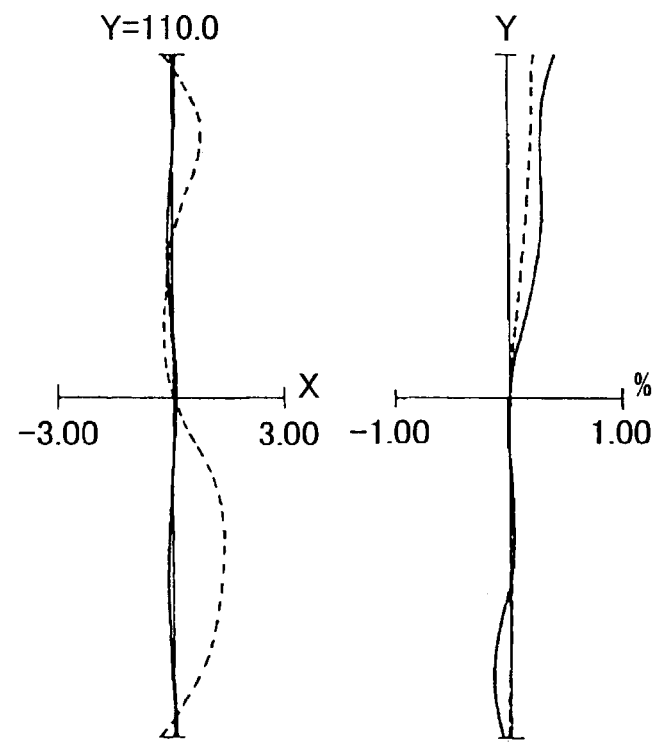
FIG. 11 is a view showing a curvature of field (in the left figure: the solid line for the sub-scanning direction; the broken line for the main scanning direction) and a uniform-velocity characteristics (in the right figure: the solid line for the linearity; the broken line for the fθ characteristic), of the second embodiment.

FIG. 11 shows, with regard to this example, the curvature of field (in the left figure: the solid line for the sub-scanning direction; the broken line for the main scanning direction) and the uniform-velocity characteristics (in the right figure: the solid line for linearity; the broken line for the fθ characteristic).

The width of curvature in the main scanning direction is 1.666 mm/220 mm. The width of curvature in the sub-scanning direction is 0.21 mm/220 mm. The linearity of the uniform-velocity characteristic is 0.555%/220 mm. Accordingly, both curvature of field and uniform-velocity characteristics are very well corrected. The sub-scanning curvature of field satisfies the above mentioned condition (3). That is:

$$0.21/220 = 0.00095 < 0.001 \quad (3)$$

Figure 12:
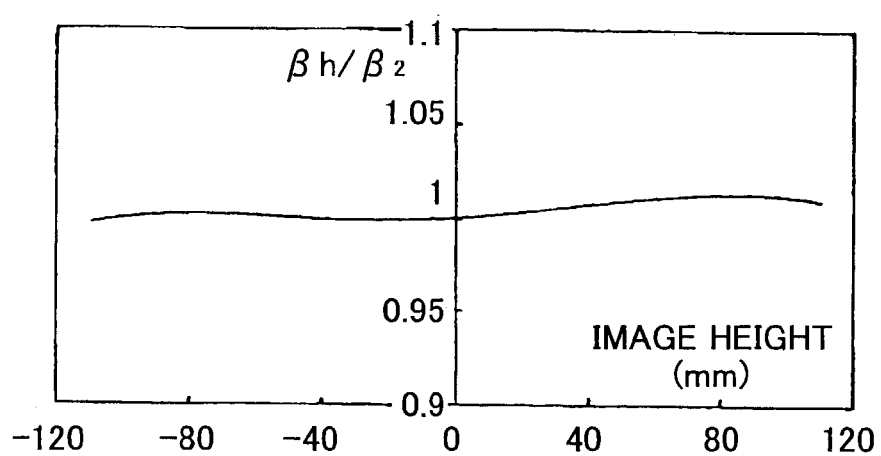
FIG. 12 is a view showing change of the lateral magnification $\beta_h$ in the sub-scanning direction at any image height with respect to the lateral magnification 2 in the sub-scanning direction at the central image height of the second embodiment.

FIG. 12 shows change of the lateral magnification $\beta_h$ in the sub-scanning direction at the any image height with respect to the lateral magnification $\beta_2$ in the sub-scanning direction at the central image height in the example 1. As a result, $$0.998 \leq |\beta_h/\beta_2| \leq 1.013 \quad (2)$$

Accordingly, the magnification change satisfies the above mentioned condition (2), and is very well corrected.

Figure 13:
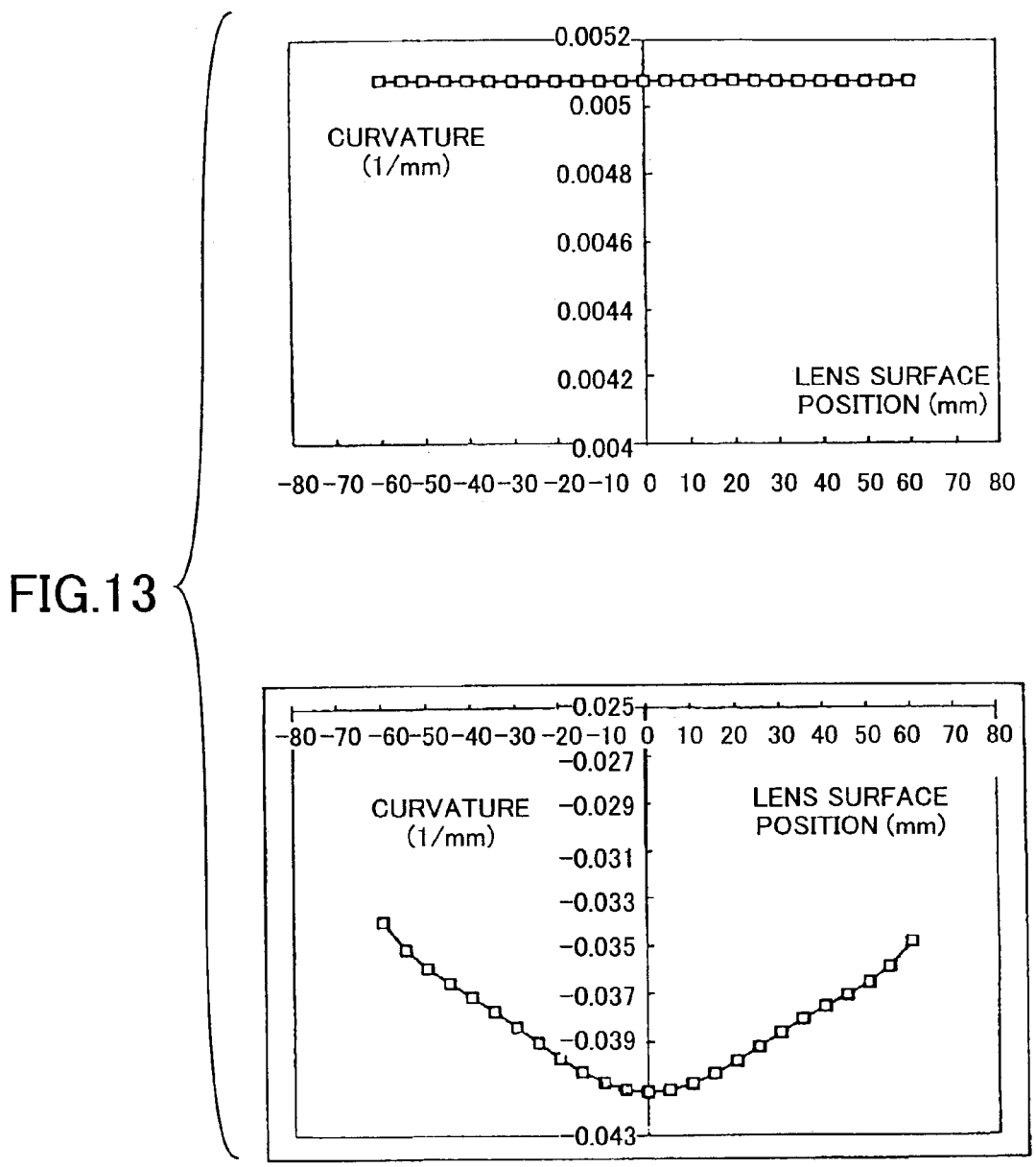
FIG. 13 is a view showing a curvature change of the entering surface and the exit surface of the lens 6.

FIG. 13 shows curvature change of the entering surface in FIG. 13-(a) and the exit surface in FIG. 13-(b) of the lens 6. In this embodiment, the entering surface is a curvature constant surface.

Figure 14:
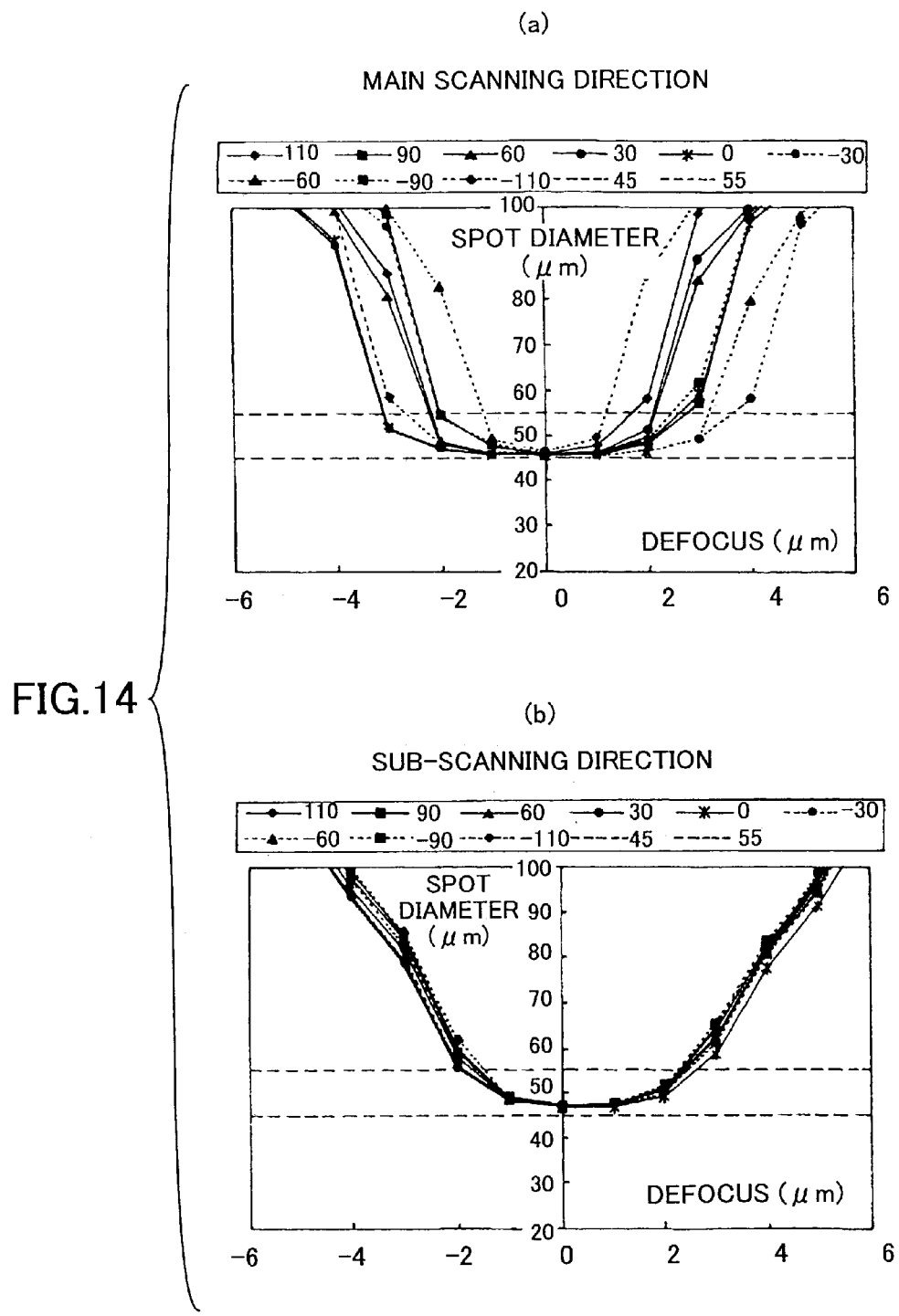
FIG. 14 is a view showing depth curves of spot diameter (change of spot diameter with respect to defocus of beam spot) for each image height of beam spot of the second embodiment.

FIG. 14 shows depth curves of spot diameter (change of spot diameter with respect to defocus of beam spot) for each image height of beam spot on the example 1. FIG. 14-(a) is for the main scanning direction while FIG. 14-(b) is for the sub-scanning direction. In the example 1, the order of 50 μm is targeted as the spot diameter defined by the $1/e^2$ intensity of the Line Spread function. As shown in the figures, satisfactory depths are provided for both the main and sub-scanning directions, Accordingly, an allowance for positional accuracy on the surface to be scanned is large.

In the above mentioned embodiment, the lens 6 acting as the scanning optical system is made of a plastic material. A glass material may be also used for the lens 6. In addition, in order to make the diameter of the beam spot even smaller, the configuration in the sub-scanning cross section may be a non-arc configuration. Furthermore, it is possible to implement aberration correction preferably by making the scanning optical system eccentric.

Figure 15:
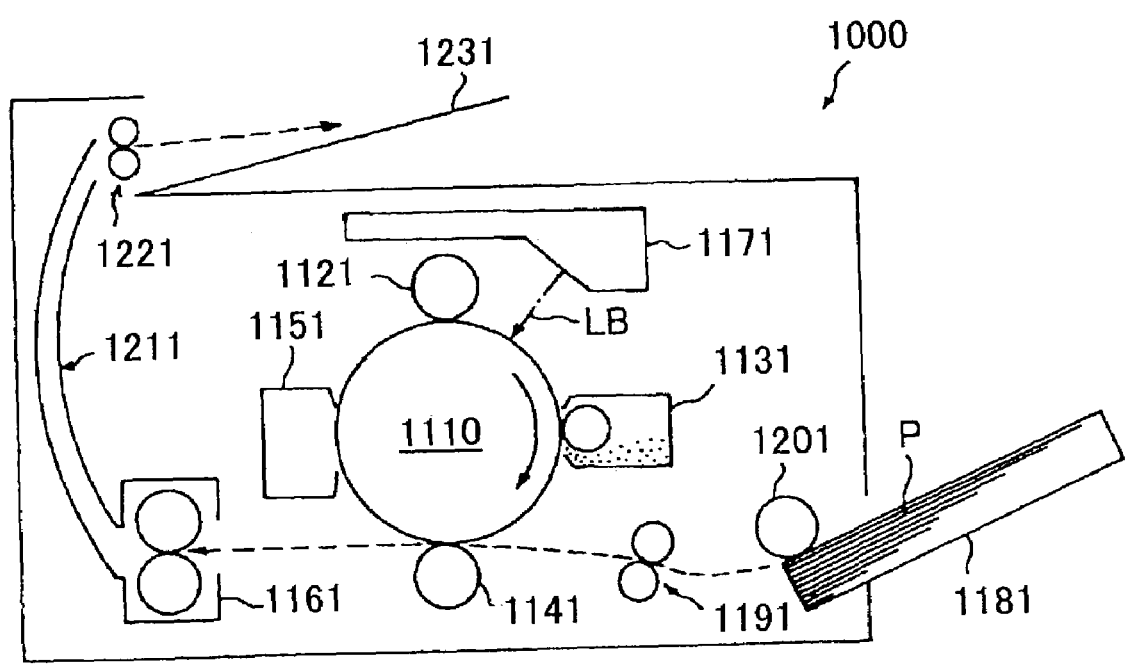
FIG. 15 is a view showing a configuration of one preferred embodiment of the image forming apparatus of the present invention.

Finally, FIG. 15 shows a configuration of one preferred embodiment of the image forming apparatus of the present invention.

In the present embodiment, the image forming apparatus of the invention is applied to a laser printer.

As shown in FIG. 15, the laser printer 1000 includes a photoconductive drum 1110 which is provided as a photosensitive image carrier. At surrounding portions around the photoconductive drum 1110, a charging roller 1121, a developing unit 1131, a transfer roller 1141, and a cleaning unit 1151 are provided. A corona charger may be used as the charging unit 1121.

In the laser printer 1000 of FIG. 15, a scanning device 1171 according to one embodiment of the present invention is provided and a scanned surface of the photoconductive drum 1110, which is located between the charging roller 1121 and the developing unit 1131, is exposed to multiple laser beams LB provided by the scanning device 1171.

Further, in the laser printer of FIG. 15, a fixing unit 1141, a paper cassette 1181, registration rollers 1191, a paper feeding roller 1201, a transport passage 1211, ejection rollers 1221, and a paper tray 1231 are provided. In the paper cassette 1181, a plurality of transfer sheets P are contained.

When an image forming operation is performed by the laser printer 1000, the photo conductive drum 1110 is rotated at a constant speed in the clock wise direction as indicated by the arrow in FIG. 15. The surface of the photoconductive drum 1110 is uniformly charged by the charging unit 1121. The charged surface of the photoconductive drum 1110 is exposed to the multiple laser beam LB (the imaging light pattern) provided by the scanning device 1171, so than an electrostatic latent image is formed on the scanned surface of the photo conductive drum 1110. In the present embodiment, the electrostatic latent image is a negative latent image.

Further, the developing unit 1131 develops the latent image of photoconductive drum 1110 with toner, and a toner image is produced on the scanned surface of the photoconductive drum 1110. In the laser printer 1000, the paper cassette 1181 is removably attached to the main body of the laser printer 1000 as shown in FIG. 15. One of transfer sheets P from the paper cassette 1181 is delivered to the inside of the main body by the paper feeding roller 1201. The leading end of this transfer sheet is held between the registration rollers 1191. At a timing that is synchronous to the time the toner image of the photoconductive drum 1110 is moved to a transferring point, the registration rollers 1191 deliver the transfer sheet through the location between the transferring roller 1141 and the photoconductive drum 1110.

The transferring roller photoconductive drum 1110 transfers the toner image to the transfer sheet that is delivered by the registration roller 1191. The transfer sheet, after the image transferring is performed, is delivered to the fixing unit 1161. The fixing unit 1161 performs a thermal fusing of the toner to the transfer sheet. The transfer sheet, after the thermal fusing is performed, is delivered through the transport passage 1211 to the ejection rollers 1221. The ejection rollers 1221 deliver the transfer sheet to the tray 1231 which is provided outside the main body of the laser printer 1000.

The cleaning unit 1151 performs a cleaning of the residual toner from the surface of the photoconductive drum 1110.

The present invention is not limited to these embodiments, but variations and modifications may be made without departing from the scope of the present invention.

As the optical deflector of the above mentioned optical scanning device, not only the rotary polygonal mirror but also a rotary single-surface mirror, a rotary double-surface mirror, and an oscillation mirror such as a galvano mirror can be used.

As the photosensitive image carrier, various types of carriers can be used. For example, a silver haloid film can be used as the image carrier. In this case, a latent image is formed by optical scanning writing and the latent image can be visualized by a normal silver haloid print process. Such an image forming apparatus can be utilized as an optical make-up apparatus or an optical paint apparatus by which a CT scanning image and others can be painted.

As the photosensitive image carrier, a coloring medium that is made to color by thermal energy of the optical spot at the time of optical scanning can be used. In this case, a visible image can be formed directly by optical scanning.

As the photosensitive image carrier, an optical conductive photoreceptor can be used. As for the optical conductive photoreceptor, either a sheet type such as a zinc oxide sheet or a drum type or a belt type that can be used repeatedly such as a selenium photoreceptor, an organic optical semiconductor, or others, can be used.

In a case where the optical conductive photoreceptor is used as the photosensitive image carrier, an electrostatic latent image is formed by a uniform charge of the photoreceptor and optical scanning with the optical scanning device. The electrostatic latent image becomes visible as a toner image by developing. In a case where the photoreceptor is the sheet type such as a zinc oxide sheet, the toner image is fixed onto the photoreceptor directly. In a case where the photoreceptor can be used repeatedly, the toner image is transferred or fixed to a sheet type recording medium such as a transfer sheet, a OHP sheet (a plastic sheet for an overhead projector), and the like.

The toner image may be transferred from the optical conductive photoreceptor to the sheet type recording medium directly (direct copy method) or first transferred from the optical conductive photoreceptor to an intermediate transferring medium such as an intermediate transferring belt and then transferred from the intermediate transferring medium to the sheet type recording medium (intermediate transferring method).

Each of the above mentioned image forming apparatuses can be realized as a laser printer, an optical plotter, a digital copier, and the like.

Furthermore, the image forming apparatus according to the present invention can be utilized as an image forming apparatus of a tandem-type image forming apparatus. In the tandem-type image forming apparatus, a plurality of the above mentioned photoreceptors are arranged along a conveyance path of the sheet type recording medium and a electrostatic latent image is formed for every photoreceptor by a plurality of the optical scanning devices. A toner image obtained by making the electrostatic latent image visible is transferred and fixed on the same sheet type recording medium so that a color image or a multicolor image can be obtained synthetically.

According to the present invention, the scanning optical system can be produced at a low price by using only a unitary lens and the optical scanning device can be made compact. In addition, not only a geometric-optic aberration but also a wave-optic wavefront aberration can be corrected well. Hence, the diameter of the optical spot can be made small. Based on such a scanning optical system, it is possible to optically scan well by the optical spot having a small diameter, so that it is possible to form a great image using the image forming apparatus having the optical scanning device.

This patent application is based on Japanese priority patent applications No. 2002-80855 filed on Mar. 22, 2002, 2002-102560 filed on Apr. 4, 2002, 2002-109377 filed on Apr. 11, 2002, 2002-116673 filed on Apr. 18, 2002, and 2002-139712 filed on May 15, 2002, the entire contents of which are hereby incorporated by reference.

What claimed is:

1. A scanning optical system comprising:
an optical deflector configured to deflect a light flux to form an optical spot on a surface to be scanned;
a unitary lens as the only lens formed between the optical deflector and the surface to be scanned, wherein in the unitary lens:
a lens configuration in a main scanning cross section is both surfaces with a convex configuration;

a lens configuration in a sub-scanning cross section is both surfaces with a convex configuration;

both surfaces of the lens are anamorphic surfaces and sub circular arc surfaces; and a lateral magnification $\beta_2$ in a sub-scanning direction of a central image height of said optical system satisfies the following condition (1):

$$0.5 \leq |\beta_2| \leq 3.0. \tag{1}$$

2. The scanning optical system as claimed in claim 1, wherein at least one surface of the lens is such that a configuration in the main scanning cross section thereof is a non-arc configuration.

3. The scanning optical system as claimed in claim 1, wherein at least one surface of the lens is a specific surface where curvature in the sub-scanning cross section is changed consecutively in a main scanning direction.

4. The scanning optical system as claimed in claim 3, wherein:

both surfaces of the lens are specific surfaces; and a change in the main scanning direction of the curvature in the sub-scanning cross section is asymmetrical with respect to an optical axis, in at least one surface of the lens.

5. The scanning optical system as claimed in claim 1, wherein said optical system is such that a lateral magnification $\beta_2$ in the sub-scanning direction at a central height and a lateral magnification $\beta_h$ in the sub-scanning direction at any height satisfy the following condition (2):

$$0.9 \leq |\beta_h / \beta_2| \leq 1.1. \tag{2}$$

6. The scanning optical system as claimed in claim 1, wherein an effective writing width W and a width $F_S$ of a sub-scanning curvature of field in the effective writing width satisfy the following condition (3):

$$F_S / W \leq 0.001. \tag{3}$$

7. The scanning optical system as claimed in claim 1, wherein:

the light flux is deflected by the optical deflector; and
the convergent light flux enters the lens in the main scanning direction.

8. The scanning optical system as claimed in claim 1, wherein a curvature radius $R_{m1}$ of an entering side surface of the lens in the main scanning cross section and a curvature radius $R_{m2}$ of an emitting side surface of the lens in the main scanning cross section satisfy the following condition (4):

$$|R_{m1}| \geq |R_{m2}|. \tag{4}$$

9. The scanning optical system as claimed in claim 1, wherein a curvature radius $R_{S1}$ of an entering side surface of the lens in the sub-scanning cross section and a curvature radius $R_{S2}$ of an emitting side surface of the lens in the sub-scanning cross section satisfy the following condition (5):

$$|R_{S1}| \geq |R_{S2}|. \tag{5}$$

10. The scanning optical system as claimed in claim 1, wherein the lens is a resin molded product.

11. The scanning optical system as claimed in claim 1, wherein said optical system is used for condensing a plurality of light fluxes simultaneously deflected so as to form a plurality of optical spots separated in the sub-scanning direction on the surface to be scanned.

12. The scanning optical system as claimed in claim 1, wherein said optical system has a function that the optical scanning of the optical spot on the surface to be scanned is made to have a uniform velocity in a main scanning direction and the surface inclination of the optical deflector is corrected in the sub-scanning direction.

13. An optical scanning device in a single-beam system coupling a light flux from a light source to a subsequent optical system by a coupling lens, forming of the coupled beam a line image long in a main scanning direction on or in the proximity of a deflection reflective surface of an optical deflector by a line-image forming optical system, deflecting the light flux by said optical deflector, condensing the deflected light flux so as to form an optical spot thereof on a surface to be scanned by a scanning optical system, and scanning said surface to be scanned, said scanning optical system comprising the scanning optical system claimed in claim 12.

14. An image forming apparatus forming an image on a photosensitive image carrier by the scanning thereof by an optical scanning device, said optical scanning device comprising the optical scanning device as claimed in claim 13.

15. An optical scanning device in a multi-beam system coupling beams from a plurality of light emitting sources to a subsequent optical system by a coupling lens, forming of the plurality of coupled light fluxes into a plurality of line images long in a main scanning direction and separate in a sub-scanning direction on or in the proximity of a deflection reflective surface of an optical deflector by a common line-image forming optical system, simultaneously deflecting the beams by said optical deflector, condensing the respective deflected light fluxes so as to form thereof a plurality of optical spots separate in the sub-scanning direction on a surface to be scanned by a common scanning optical system, and scanning said surface to be scanned by the plurality of optical spots so as to draw a plurality of scan lines simultaneously thereon, said common scanning optical system comprising the scanning optical system claimed in claim 12.

16. The optical scanning device as claimed in claim 15, wherein said plurality of light-emitting sources comprise a monolithic semiconductor laser array in which the plurality of light-emitting sources are arranged so as to form a line.

17. A scanning optical system comprising:

an optical deflector configured to deflect a light flux to form an optical spot on a surface to be scanned;

a unitary lens as the only lens formed between the optical deflector and the surface to be scanned, wherein in the unitary lens:

a lens configuration in a main scanning cross section is both surfaces with a convex configuration;

a lens configuration in a sub-scanning cross section is both surfaces with a convex configuration;

both surfaces of the lens are anamorphic surfaces and sub circular arc surfaces;

a curvature radius $R_{m1}$ of an entering side surface in the main scanning cross section and a curvature radius $R_{m2}$ of an emitting side surface in the main scanning cross section satisfy the following condition (4):

$$|R_{m1}| \geq |R_{m2}|; \text{ and} \tag{4}$$

a curvature radius $R_{S1}$ of an entering side surface in the sub-scanning cross section and a curvature radius $R_{S2}$ of an emitting side surface in the sub-scanning cross section satisfy the following condition (5):

$$|R_{S1}| \geq |R_{S2}|. \tag{5}$$

18. The scanning optical system as claimed in claim 17, wherein at least one surface of the lens is such that a configuration in the main scanning cross section thereof is a non-arc configuration.

19. The scanning optical system as claimed in claim 17, wherein at least one surface of the lens is a specific surface where curvature in the sub-scanning cross section is changed consecutively in a main scanning direction.

20. The scanning optical system as claimed in claim 19, wherein:

both surfaces of the lens are specific surfaces; and a change in the main scanning direction of a curvature in the sub-scanning cross section is asymmetrical with respect to an optical axis, in at least one surface of the lens.

21. The scanning optical system as claimed in claim 17, wherein a lateral magnification $\beta_2$ in a sub-scanning direction of a central image height of said optical system satisfies the following condition (1):

$$0.5 \leq |\beta_2| \leq 3.0. \quad (1)$$

22. The scanning optical system as claimed in claim 17, wherein said optical system is such that a lateral magnification $\beta_2$ in a sub-scanning direction at a central height and a lateral magnification $\beta_h$ in the sub-scanning direction at any height satisfy the following condition (2):

$$0.9 \leq |\beta_h/\beta_2| \leq 1.1. \quad (2)$$

23. The scanning optical system as claimed in claim 17, wherein an effective writing width W and a width $F_S$ of a sub-scanning curvature of field in the effective writing width satisfy the following condition (3):

$$F_S/W \leq 0.001. \quad (3)$$

24. The scanning optical system as claimed in claim 17, wherein:

the light flux is deflected by the optical deflector; and the convergent light flux enters the lens in a main scanning direction.

25. The scanning optical system as claimed in claim 17, wherein said optical system has a function that the optical scanning of the optical spot on the surface to be scanned is made to have a uniform velocity in a main scanning direction and the surface inclination of the optical deflector is corrected in a sub-scanning direction.

26. The scanning optical system as claimed in claim 17, wherein the lens is a resin molded product.

27. The scanning optical system as claimed in claim 17, wherein said optical system is used for condensing a plurality of light fluxes simultaneously deflected so as to form a plurality of optical spots separated in a sub-scanning direction on the surface to be scanned.

28. An optical scanning device in a multi-beam system coupling beams from a plurality of light emitting sources to a subsequent optical system by a coupling lens, forming of the plurality of coupled light fluxes into a plurality of line images long in a main scanning direction and separate in a sub-scanning direction on or in the proximity of a deflection reflective surface of an optical deflector by a common line-image forming optical system, simultaneously deflecting the beams by said optical deflector, condensing the respective deflected light fluxes so as to form thereof a plurality of optical spots separate in the sub-scanning direction on a surface to be scanned by a common scanning optical system, and scanning said surface to be scanned by the plurality of optical spots so as to draw a plurality of scan lines simultaneously thereon, said common scanning optical system comprising the scanning optical system claimed in claim 27.

29. The optical scanning device as claimed in claim 28, wherein said plurality of light-emitting sources comprise a monolithic semiconductor laser array in which the plurality of light-emitting sources are arranged so as to form a line.

30. An optical scanning device in a single-beam system coupling a light flux from a light source to a subsequent optical system by a coupling lens, forming of the coupled beam a line image long in a main scanning direction on or in the proximity of a deflection reflective surface of an optical deflector by a line-image forming optical system, deflecting the light flux by said optical deflector, condensing the deflected light flux so as to form an optical spot thereof on a surface to be scanned by a scanning optical system, and scanning said surface to be scanned, said scanning optical system comprising the scanning optical system claimed in claim 17.

31. An image forming apparatus forming an image on a photosensitive image carrier by the scanning thereof by an optical scanning device, said optical scanning device comprising the optical scanning device as claimed in claim 30.

32. A scanning optical system comprising:

an optical deflector configured to deflect a light flux to form an optical spot on a surface to be scanned;

a unitary lens as the only lens formed between the optical deflector and the surface to be scanned, wherein in the unitary lens:

a lens configuration in a main scanning cross section is both surfaces with a convex configuration;

a lens configuration in a sub-scanning cross section is both surfaces with a convex configuration;

both surfaces of the lens are anamorphic surfaces and sub circular arc surfaces;

a configuration in a main scanning cross section of the both surfaces is a non-arc configuration;

both surfaces of the lens are specific surfaces where curvature in the sub-scanning cross section is changed consecutively in a main scanning direction; and a change in the main scanning direction of a curvature in the sub-scanning cross section is asymmetrical with respect to an optical axis, in at least one surface of the lens.

33. The scanning optical system as claimed in claim 32, wherein:

the light flux is deflected by the optical deflector; and the convergent light flux enters the lens in the main scanning direction.

34. The scanning optical system as claimed in claim 32, wherein a lateral magnification $\beta_2$ in the sub-scanning direction of a central image height of said optical system satisfies the following condition (1):

$$0.5 \leq |\beta_2| \leq 3.0. \quad (1)$$

35. The scanning optical system as claimed in claim 32, wherein said optical system is such that a lateral magnification $\beta_2$ in the sub-scanning direction at a central height and a lateral magnification $\beta_h$ in the sub-scanning direction at any height satisfy the following condition (2):

$$0.9 \leq |\beta_h/\beta_2| \leq 1.1. \quad (2)$$

36. The scanning optical system as claimed in claim 32, wherein an effective writing width W and a width $F_S$ of a sub-scanning curvature of field in the effective writing width satisfy the following condition (3):

$$F_S/W \leq 0.001. \tag{3}$$

37. The scanning optical system as claimed in claim 32, wherein a curvature radius $R_{m1}$ of an entering side surface of the lens in the main scanning cross section and a curvature radius $R_{m2}$ of an emitting side surface of the lens in the main scanning cross section satisfy the following condition (4):

$$|R_{m1}| \geq |R_{m2}|. \tag{4}$$

38. The scanning optical system as claimed in claim 32, wherein a curvature radius $R_{S1}$ of an entering side surface of the lens in the sub-scanning cross section and a curvature radius $R_{S2}$ of an emitting side surface of the lens in the sub-scanning cross section satisfy the following condition (5):

$$|R_{S1}| \geq |R_{S2}|. \tag{5}$$

39. The scanning optical system as claimed in claim 32, wherein the lens is a resin molded product.

40. The scanning optical system as claimed in claim 32, wherein said optical system is used for condensing a plurality of light fluxes simultaneously deflected so as to form a plurality of optical spots separated in the sub-scanning direction on the surface to be scanned.

41. The scanning optical system as claimed in claim 32, wherein said optical system has a function that the optical scanning of the optical spot on the surface to be scanned is made to have a uniform velocity in the main scanning direction and the surface inclination of the optical deflector is corrected in the sub-scanning direction.

42. An optical scanning device in a single-beam system coupling a light flux from a light source to a subsequent optical system by a coupling lens, forming of the coupled beam a line image long in a main scanning direction on or in the proximity of a deflection reflective surface of an optical deflector by a line-image forming optical system, deflecting the light flux by said optical deflector, condensing the deflected light flux so as to form an optical spot thereof on a surface to be scanned by a scanning optical system, and scanning said surface to be scanned, said scanning optical system comprising the scanning optical system claimed in claim 41.

43. An image forming apparatus forming an image on a photosensitive image carrier by the scanning thereof by an optical scanning device, said optical scanning device comprising the optical scanning device as claimed in claim 42.

44. An optical scanning device in a multi-beam system coupling beams from a plurality of light emitting sources to a subsequent optical system by a coupling lens, forming of the plurality of coupled light fluxes a plurality of line images long in a main scanning direction and separate in a sub-scanning direction on or in the proximity of a deflection reflective surface of an optical deflector by a common line-image forming optical system, simultaneously deflecting the beams by said optical deflector, condensing the respective deflected light fluxes so as to form thereof a plurality of optical spots separate in the sub-scanning direction on a surface to be scanned by a common scanning optical system, and scanning said surface to be scanned by the plurality of optical spots so as to draw a plurality of scan lines simultaneously thereon, said common scanning optical system comprising the scanning optical system claimed in claim 41.

45. The optical scanning device as claimed in claim 44, wherein said plurality of light-emitting sources comprise a monolithic semiconductor laser array in which the plurality of light-emitting sources are arranged so as to form a line.

46. A scanning optical system comprising:

an optical deflector configured to deflect a light flux to form an optical spot on a surface to be scanned;

a unitary lens as the only lens formed between the optical deflector and the surface to be scanned, wherein in the unitary lens:

a lens configuration in a main scanning cross section is both surface with a convex configuration;

a lens configuration in a sub-scanning cross section is both surface with a convex configuration;

both surfaces of the lens are anamorphic surfaces and sub circular arc surfaces; and at least one surface of the lens is a curvature constant surface where curvature in the sub-scanning cross section is constant in a main scanning direction.

47. The scanning optical system as claimed in claim 46, wherein one surface is the curvature constant surface, and the other surface is a specific surface where curvature in the sub-scanning cross section is changed consecutively in the main scanning direction.

48. The scanning optical system as claimed in claim 47, wherein a change in the main scanning direction of the curvature in the sub-scanning cross section at the specific surface is asymmetrical with respect to an optical axis.

49. The scanning optical system as claimed in claim 46, wherein at least one surface of the lens is such that a configuration in the main scanning cross section thereof is a non-arc configuration.

50. The scanning optical system as claimed in claim 46, wherein a lateral magnification $\beta_2$ in the sub-scanning direction of a central image height of said optical system satisfies the following condition (1):

$$0.5 \leq |\beta_2| \leq 3.0. \tag{1}$$

51. The scanning optical system as claimed in claim 46, wherein said optical system is such that a lateral magnification $\beta_2$ in the sub-scanning direction at a central height and a lateral magnification $\beta_h$ in the sub-scanning direction at any height satisfy the following condition (2):

$$0.9 \leq |\beta_h/\beta_2| \leq 1.1. \tag{2}$$

52. The scanning optical system as claimed in claim 46, wherein an effective writing width W and a width $F_S$ of a sub-scanning curvature of field in the effective writing width satisfy the following condition (3):

$$F_S/W \leq 0.001. \tag{3}$$

53. The scanning optical system as claimed in claim 46, wherein a curvature radius $R_{m1}$ of an entering side surface of the lens in the main scanning cross section and a curvature radius $R_{m2}$ of an emitting side surface of the lens in the main scanning cross section satisfy the following condition (4):

$$|R_{m1}| \geq |R_{m2}|. \tag{4}$$

54. The scanning optical system as claimed in claim 46, wherein a curvature radius $R_{S1}$ of an entering side surface of the lens in the sub-scanning cross section and a curvature radius $R_{S2}$ of an emitting side surface of the lens in the sub-scanning cross section satisfy the following condition (5):

$$|R_{S1}| \geq |R_{S2}|. \tag{5}$$

55. The scanning optical system as claimed in claim 46, wherein:

the light flux is deflected by the optical deflector; and the convergent light flux enters the lens in the main scanning direction.

56. The scanning optical system as claimed in claim 46, wherein said optical system has a function that the optical scanning of the optical spot on the surface to be scanned is made to have a uniform velocity in the main scanning direction and the surface inclination of the optical deflector is corrected in the sub-scanning direction.

57. The scanning optical system as claimed in claim 46, wherein the lens is a resin molded product.

58. The scanning optical system as claimed in claim 46, wherein said optical system is used for condensing a plurality of light fluxes simultaneously deflected so as to form a plurality of optical spots separated in the sub-scanning direction on the surface to be scanned.

59. An optical scanning device in a multi-beam system coupling beams from a plurality of light emitting sources to a subsequent optical system by a coupling lens, forming a plurality of coupled light fluxes into a plurality of line images long in a main scanning direction and separate in a sub-scanning direction on or in the proximity of a deflection reflective surface of an optical deflector by a common line-image forming optical system, simultaneously deflecting the beams by said optical deflector, condensing the respective deflected light fluxes so as to form thereof a plurality of optical spots separate in the sub-scanning direction on a surface to be scanned by a common scanning optical system, and scanning said surface to be scanned by the plurality of optical spots so as to draw a plurality of scan lines simultaneously thereon, said common scanning optical system comprising the scanning optical system claimed in claim 58.

60. The optical scanning device as claimed in claim 59, wherein said plurality of light-emitting sources comprise a monolithic semiconductor laser array in which the plurality of light-emitting sources are arranged so as to form a line.

61. An optical scanning device in a single-beam system coupling a light flux from a light source to a subsequent optical system by a coupling lens, forming of the coupled beam a line image long in a main scanning direction on or in the proximity of a deflection reflective surface of an optical deflector by a line-image forming optical system, deflecting the light flux by said optical deflector, condensing the deflected light flux so as to form an optical spot thereof on a surface to be scanned by a scanning optical system, and scanning said surface to be scanned, said scanning optical system comprising the scanning optical system claimed in claim 46.

62. An image forming apparatus forming a latent image on a photosensitive image carrier by the scanning thereof by an optical scanning device, and visualizing the latent image by developing means so as to obtain image, said optical scanning device comprising the optical scanning device as claimed in claim 61.

* * * * *